(12) United States Patent
Takita et al.

(10) Patent No.: US 7,988,895 B2
(45) Date of Patent: Aug. 2, 2011

(54) PRODUCTION METHOD OF MICROPOROUS POLYETHYLENE MEMBRANE AND BATTERY SEPARATOR

(75) Inventors: Kotaro Takita, Tochigi-ken (JP); Shintaro Kikuchi, Saitama-ken (JP); Kotaro Kimishima, Kanagawa-ken (JP)

(73) Assignee: Toray Tonen Specialty Separator Godo Kaisha, Nasushiobara, Tochigi (JP)

( * ) Notice: Subject to any disclaimer, the term of this patent is extended or adjusted under 35 U.S.C. 154(b) by 307 days.

(21) Appl. No.: 12/088,037

(22) PCT Filed: Sep. 27, 2006

(86) PCT No.: PCT/JP2006/319208
§ 371 (c)(1),
(2), (4) Date: Mar. 25, 2008

(87) PCT Pub. No.: WO2007/037289
PCT Pub. Date: Apr. 5, 2007

(65) Prior Publication Data
US 2009/0269672 A1    Oct. 29, 2009

(30) Foreign Application Priority Data
Sep. 28, 2005    (JP) .................................. 2005-283030

(51) Int. Cl.
B29C 47/06    (2006.01)

(52) U.S. Cl. .................. 264/176.1; 264/41; 264/274

(58) Field of Classification Search ............. 264/41, 264/274; 429/254
See application file for complete search history.

(56) References Cited

U.S. PATENT DOCUMENTS

| | | | |
|---|---|---|---|
| 5,240,655 A * | 8/1993 | Troffkin et al. ............... 264/28 |
| 2005/0058823 A1 * | 3/2005 | Funaoka et al. ............. 428/315.5 |
| 2006/0103055 A1 | 5/2006 | Hoshuyama et al. | |

FOREIGN PATENT DOCUMENTS

| | | |
|---|---|---|
| JP | 10-296839 A | 11/1998 |
| JP | 2000-212323 A | 8/2000 |
| JP | 2000-248093 A | 9/2000 |
| JP | 2003-105123 A | 4/2003 |
| JP | 2004-161899 A | 6/2004 |
| WO | 99/48959 A1 | 9/1999 |
| WO | 00/20492 A1 | 4/2000 |

* cited by examiner

Primary Examiner — Christina Johnson
Assistant Examiner — Larry Thrower
(74) Attorney, Agent, or Firm — Sughrue Mion, PLLC

(57) ABSTRACT

A microporous polyethylene membrane having well-balanced permeability, mechanical properties, heat shrinkage resistance, compression resistance, electrolytic solution absorbability, shutdown properties and meltdown properties, with an average pore diameter changing in a thickness direction is produced by melt-blending a polyethylene resin and a membrane-forming solvent to prepare a solution A having a resin concentration of 25 to 50% by mass and a solution B having a resin concentration of 10 to 30% by mass, the resin concentration in the solution A being higher than that in the solution B, (a) simultaneously extruding the resin solutions A and B through a die, cooling the resultant extrudate to provide a gel-like sheet in which the resin solutions A and B are laminated, and removing the membrane-forming solvent from the gel-like sheet, or (b) extruding the resin solutions A and B through separate dies, removing the membrane-forming solvent from the resultant gel-like sheets A and B to form microporous polyethylene membranes A and B, and alternately laminating the microporous polyethylene membranes A and B, while easily controlling the average pore diameter distribution in the microporous polyethylene membrane in a thickness direction.

8 Claims, No Drawings

PRODUCTION METHOD OF MICROPOROUS POLYETHYLENE MEMBRANE AND BATTERY SEPARATOR

CROSS REFERENCE TO RELATED APPLICATIONS

This application is a National Stage of International Application No. PCT/JP2006/319208 filed on Sep. 27, 2006, claiming priority based on Japanese Patent Application No. 2005-283030, filed Sep. 28, 2005, the contents of all of which are incorporated herein by reference in their entirety.

FIELD OF THE INVENTION

This invention relates to a method for producing a microporous polyethylene membrane, and a battery separator, particularly to a method for producing a microporous polyethylene membrane with an average pore diameter changing in a thickness direction, and a battery separator.

BACKGROUND OF THE INVENTION

Microporous polyolefin membranes are widely used in separators for lithium batteries, etc., electrolytic capacitor separators, various filters, etc. When the microporous polyolefin membranes are used as battery separators, their performance largely affects the performance, productivity and safety of batteries. Particularly lithium ion battery separators are required to have excellent mechanical properties and permeability, as well as shutdown property, a function of closing pores to stop a battery reaction at the time of abnormal heat generation, thereby preventing the heat generation, ignition and explosion of the battery, which can be caused by the short-circuiting of external circuits, overcharge, etc.; heat shrinkage resistance, a function of keeping a separator shape to avoid a direct reaction between a cathode material and an anode material even when becoming high temperatures, etc.

Recently gaining importance as separator characteristics are not only permeability, mechanical strength, heat shrinkage resistance and thermal properties (shutdown properties and meltdown properties), but also battery life properties such as cycle properties (properties concerning battery capacity when used repeatedly), and battery productivity such as electrolytic solution absorbability. A lithium ion battery electrode expands by the intrusion of lithium when charged, and shrinks by the departure of lithium when discharged, an expansion ratio when charged tending to become larger as recent increase in the capacity of batteries. Because a separator is compressed when the electrode expands, the separator is required to suffer only small permeability variation by compression to have excellent cycle properties. To that end, there are (i) a technology of providing a separator with a gradient structure comprising a coarse-structure layer having a relatively large average pore diameter, which undergoes large deformation with small air permeability change when compressed, and a dense-structure layer having a relatively small average pore diameter, which undergoes large air permeability change with small deformation when compressed, the coarse-structure layer absorbing the expansion of an electrode and holding permeability; and (ii) a technology of making the deformation of the entire separator small to prevent a pore structure from being broken. These technologies are properly selected depending on the properties of electrodes.

To improve the electrolytic solution absorbability, it is effective to provide a large pore size to the separator surface. Also, to prevent by-products generated by the repetition of charge/discharge cycles from clogging the separator, the separator is required to have a large pore size on the surface. However, to secure the mechanical strength, a dense layer is needed. Thus, to satisfy both requirements of high electrolytic solution absorbability and high mechanical strength, the separator is desired to have a coarse-structure layer having a relatively large average pore diameter on at least one surface, in addition to a dense-structure layer.

Liquid filters are desired to have higher filtering performance, and for this purpose, microporous membranes should have smaller pores. However, to avoid decrease in the filtering efficiency, the microporous membrane should not deteriorate liquid permeability. To meet both requirements of high filtering performance and high liquid permeability, the liquid filters desirably have the above gradient structure. Specifically, the balance of the filtering performance and the liquid permeability can be controlled by constituting the microporous membrane by a dense-structure layer as a support layer and a coarse-structure layer as a filtering layer, and adjusting the thickness ratio of the dense-structure layer to the coarse-structure layer.

A microporous polyolefin membrane, JP 2000-212323 A discloses a microporous polyolefin membrane different between the internal structure and the surface structure to have excellent pin puncture strength and porosity, which has an average pore size of 0.01 to 0.2 µm, at least one surface thereof having an average pore size of 0.5 to 2 µm. This microporous polyolefin membrane is produced by (i) melt-blending a polyolefin and a plasticizer to prepare a polyolefin solution, extruding and cooling the polyolefin solution to form a sheet, stretching the sheet, and then extracting the plasticizer from the stretched sheet to form a microporous membrane 1 having an average pore size of 0.5 to 2 µm on at least one surface, (ii) further stretching the microporous membrane 1 while heating to form a microporous membrane 2 having an average pore size of 0.01 µm or more, and (iii) laminating the microporous membranes 1 and 2.

JP 2003-105123 A discloses a microporous polyolefin membrane comprising polyethylene having a mass-average molecular weight (Mw) of $5 \times 10^5$ or more as an indispensable component, and having an average pore size change in a thickness direction, wherein at least one surface thereof is larger in average pore size than inside, or wherein one surface being larger in average pore size than the other surface, so that the microporous polyolefin membrane has excellent pin puncture strength, heat shrinkage resistance and permeability. This microporous polyolefin membrane is produced by (a) melt-blending a polyolefin comprising polyethylene having Mw of $5 \times 10^5$ or more as an indispensable component with a membrane-forming solvent, extruding the resultant melt blend through a die, cooling the extruded melt blend to provide a gel-like sheet, biaxially stretching the gel-like sheet with a temperature distribution in a thickness direction, removing the solvent from the stretched gel-like sheet, stretching the resultant membrane in at least one direction, and then heat-treating the membrane at a temperature in a range of the crystal dispersion temperature of the polyolefin or higher and lower than the melting point of the polyolefin to form a microporous membrane (i), (b) stretching the above gel-like sheet in at least one direction at a temperature lower than the crystal dispersion temperature of the polyolefin, and then stretching the gel-like sheet in at least one direction at a temperature in a range of the crystal dispersion temperature of the polyolefin or higher and lower than the melting point of the polyolefin, and further removing the solvent from the stretched membrane to form a microporous membrane (ii), and (c) laminating the microporous membranes (i) and (ii). In the microporous membranes of the above references, however, layers having different average pore sizes are formed under different stretching conditions, but not under different melt blend concentrations. Accordingly, they do not necessarily have well-balanced permeability, mechanical properties, heat shrinkage resistance, compression resistance, shutdown properties and meltdown properties.

OBJECT OF THE INVENTION

Accordingly, an object of this invention is to provide a method for producing a microporous polyethylene membrane having well-balanced permeability, mechanical properties, heat shrinkage resistance, compression resistance, electrolytic solution absorbability, shutdown properties and meltdown properties, with an average pore diameter changing in a thickness direction, while easily controlling the average pore diameter distribution in a thickness direction, and a battery separator.

DISCLOSURE OF THE INVENTION

As a result of intense research in view of the above object, the inventors have found that a microporous polyethylene membrane having well-balanced permeability, mechanical properties, heat shrinkage resistance, compression resistance, electrolytic solution absorbability, shutdown properties and meltdown properties, with an average pore diameter changing in a thickness direction can be produced by melt-blending a polyethylene resin and a membrane-forming solvent to prepare a solution A having a resin concentration of 25 to 50% by mass and a solution B having a resin concentration of 10 to 30% by mass, the resin concentration in the solution A being higher than that in the solution B, (a) simultaneously extruding the resin solutions A and B through a die, cooling the resultant extrudate to provide a gel-like sheet in which the resin solutions A and B are laminated, and removing the membrane-forming solvent from the gel-like sheet, or (b) extruding the resin solutions A and B through separate dies, removing the membrane-forming solvent from the resultant gel-like sheets A and B to form microporous polyethylene membranes A and B, and alternately laminating the microporous polyethylene membranes A and B, the average pore diameter distribution in the microporous polyethylene membrane in a thickness direction being easily controlled. This invention has been completed based on such finding.

Thus, the first method of this invention for producing a microporous polyethylene membrane having an average pore diameter changing in a thickness direction comprises the steps of melt-blending at least a polyethylene resin and a membrane-forming solvent to prepare a polyethylene resin solution A having a resin concentration of 25 to 50% by mass and a polyethylene resin solution B having a resin concentration of 10 to 30% by mass, the resin concentration in the polyethylene resin solution A being higher than that in the polyethylene resin solution B; simultaneously extruding the polyethylene resin solutions A and B through a die; cooling the resultant laminate extrudate to provide a gel-like sheet; and removing the membrane-forming solvent from the gel-like sheet.

The second method of this invention for producing a microporous polyethylene membrane having an average pore diameter changing in a thickness direction comprises the steps of melt-blending at least a polyethylene resin and a membrane-forming solvent to prepare a polyethylene resin solution A having a resin concentration of 25 to 50% by mass and a polyethylene resin solution B having a resin concentration of 10 to 30% by mass, the resin concentration in the polyethylene resin solution A being higher than that in the polyethylene resin solution B; extruding the polyethylene resin solutions A and B through separate dies; cooling the resultant extrudates to provide gel-like sheets A and B; removing the membrane-forming solvent from the gel-like sheets A and B to form microporous polyethylene membranes A and B; and alternately laminating the microporous polyethylene membranes A and B.

The resin concentration difference between the polyethylene resin solutions A and B is preferably 5% or more by mass, more preferably 10% or more by mass. The polyethylene resin preferably comprises a polyethylene composition comprising ultra-high-molecular-weight polyethylene having a mass-average molecular weight of $7 \times 10^5$ or more, and high-density polyethylene having a mass-average molecular weight of $1 \times 10^4$ or more and less than $5 \times 10^5$. The polyethylene resin can comprise a heat-resistant resin having a melting point or glass transition temperature of 150° C. or higher. The heat-resistant resin is preferably polypropylene or polybutylene terephthalate.

The battery separator of this invention is produced by the above first or second method.

DESCRIPTION OF THE PREFERRED EMBODIMENTS

[1] Polyethylene Resin

The polyethylene resin forming the microporous polyethylene membrane, which can be called simply as "microporous membrane" below, is (a) ultra-high-molecular-weight polyethylene, (b) polyethylene other than the ultra-high-molecular-weight polyethylene, (c) a mixture of the ultra-high-molecular-weight polyethylene and the other polyethylene (polyethylene composition), (d) a mixture of any one of (a) to (c) with a polyolefin other than polyethylene, polypropylene and polymethylpentene (polyolefin composition), or (e) a mixture of any one of (a)-(d) with a heat-resistant resin having a melting point or glass transition temperature Tg of 150° C. or higher (heat-resistant polyethylene resin composition). In any case, the mass-average molecular weight (Mw) of the polyethylene resin is preferably $1 \times 10^4$ to $1 \times 10^7$, more preferably $1 \times 10^4$ to $5 \times 10^6$, particularly $1 \times 10^4$ to $4 \times 10^6$, through not particularly critical. With the polyethylene resin having Mw of $5 \times 10^6$ or less, a microporous layer having a large pore size and high permeability can be obtained.

(a) Ultra-High-Molecular-Weight Polyethylene

The ultra-high-molecular-weight polyethylene has Mw of $7 \times 10^5$ or more. The ultra-high-molecular-weight polyethylene can be not only an ethylene homopolymer, but also an ethylene-α-olefin copolymer containing a small amount of another α-olefin. The other α-olefins than ethylene are preferably propylene, butene-1, pentene-1, hexene-1, 4-methylpentene-1, octene, vinyl acetate, methyl methacrylate, and styrene. The Mw of the ultra-high-molecular-weight polyethylene is preferably $1 \times 10^6$ to $15 \times 10^6$, more preferably $1 \times 10^6$ to $5 \times 10^6$. Not only one type of ultra-high-molecular-weight polyethylene, but also a mixture of two or more ultra-high-molecular-weight polyethylenes can be used. The mixture can be, for instance, a mixture of two or more ultra-high-molecular-weight polyethylenes having different Mws.

(b) Polyethylene Other Than Ultra-High-Molecular-Weight Polyethylene

The polyethylene other than the ultra-high-molecular-weight polyethylene has Mw of $1 \times 10^4$ or more and less than $5 \times 10^5$, preferably being at least one selected from the group consisting of high-density polyethylene, intermediate-density polyethylene, branched low-density polyethylene and linear low-density polyethylene, more preferably high-density polyethylene. The polyethylene having Mw of $1 \times 10^4$ or more and less than $5 \times 10^5$ can be not only an ethylene homopolymer, but also a copolymer containing a small amount of another α-olefin such as propylene, butene-1, hexene-1, etc. Such copolymers are preferably produced using single-site catalysts. Not only one type of polyethylene other than the ultra-high-molecular-weight polyethylene, but also a mixture of two or more polyethylenes other than the ultra-high-molecular-weight polyethylene can be used. The mixture can be for instance, a mixture of two or more high-density polyethylenes having different Mws, a mixture of similar intermediate-density polyethylenes, a mixture of similar low-density polyethylenes, etc.

(c) Polyethylene Composition

The polyethylene composition is a mixture of ultra-high-molecular-weight polyethylene having Mw of $7 \times 10^5$ or more, and the other polyethylene, which is at least one selected from the group consisting of high-density polyethylene, intermediate-density polyethylene, branched low-density polyethylene, and linear low-density polyethylene. The ultra-high-molecular-weight polyethylene and the other polyethylene can be the same as described above. The other polyethylene preferably has Mw of $1 \times 10^4$ or more and less than $5 \times 10^5$ The molecular weight distribution [mass-average molecular weight/number-average molecular weight (Mw/Mn)] of this polyethylene composition can be easily controlled depending on applications. The polyethylene composition is preferably a composition of the above ultra-high-molecular-weight polyethylene and high-density polyethylene. The content of the ultra-high-molecular-weight polyethylene in the polyethylene composition is preferably 1% or more by mass, more preferably 2 to 50% by mass, based on 100% by mass of the entire polyethylene composition.

(d) Polyolefin Composition

The polyolefin composition is a mixture of the ultra-high-molecular-weight polyethylene, the other polyethylene or the polyethylene composition, and a polyolefin other than polyethylene, polypropylene and polymethylpentene. The ultra-high-molecular-weight polyethylene, the other polyethylene, and the polyethylene composition can be the same as described above.

The polyolefin other than polyethylene, polypropylene and polymethylpentene can be at least one selected from the group consisting of polybutene-1, polypentene-1, polyhexene-1, polyoctene-1, polyvinyl acetate, polymethyl methacrylate, polystyrene and ethylene-α-olefin copolymers each having Mw of $1 \times 10^4$ to $4 \times 10^6$, and a polyethylene wax having Mw of $1 \times 10^3$ to $1 \times 10^4$. Polybutene-1, polypentene-1, polyhexene-1, polyoctene-1, polyvinyl acetate, polymethyl methacrylate and polystyrene can be not only homopolymers, but also copolymers containing other α-olefins. The content of the polyolefin other than polyethylene, polypropylene and polymethylpentene is preferably 20% or less by mass, more preferably 10% or less by mass, based on 100% by mass of the entire polyolefin composition.

(e) Heat-Resistant Polyethylene Resin Composition

The heat-resistant polyethylene resin composition is a mixture of any one of (a)-(d) above and a heat-resistant resin having a melting point or glass transition temperature Tg of 150° C. or higher. The heat-resistant resin is preferably a crystalline resin (including partially crystalline resin) having a melting point of 150° C. or higher, or an amorphous resin having Tg of 150° C. or higher. The melting point and Tg can be measured according to JIS K7121.

Because a battery separator formed by a microporous membrane comprising the polyethylene resin containing the heat-resistant resin has an improved meltdown temperature, batteries are provided with improved high-temperature storage stability. The heat-resistant resin is dispersed in the form of spherical or ellipsoidal fine particles in the homopolymer or composition described in (a)-(d) above during melt blending. Fibrils of a polyethylene phase (a phase of the ultra-high-molecular-weight polyethylene, the other polyethylene or the polyethylene composition) are cleft with fine, heat-resistant resin particles as nuclei during stretching, thereby forming craze-like pores holding fine particles in the center. As a result, the battery separator formed by the microporous polyethylene membrane has improved compression resistance and electrolytic solution absorbability. The sizes of the spherical fine particles and the major axes of the ellipsoidal fine particles are preferably 0.1 to 15 µm, more preferably 0.5 to 10 µm, particularly 1 to 10 µm.

When the crystalline resin having a melting point of lower than 150° C. or the amorphous resin having Tg of lower than 150° C. is used, the resin is highly dispersed in the homopolymer or composition described in (a)-(d) above during melt blending, failing to form fine particles having proper diameters. As a result, small gaps are formed by cleavage with fine resin particles as nuclei, failing to expect further improvement in compression resistance and electrolytic solution absorbability. The upper limit of the melting point or Tg of the heat-resistant resin is preferably 350° C. from the aspect of blendability with the homopolymer or composition described in (a)-(d) above, through not particularly critical. The melting point or Tg of the heat-resistant resin is more preferably 170 to 260° C.

The Mw of the heat-resistant resin is preferably $1 \times 10^3$ to $1 \times 10^6$, more preferably $1 \times 10^4$ to $7 \times 10^5$, though variable depending on the type of the resin. The heat-resistant resin having Mw of less than $1 \times 10^3$ is highly dispersed in the homopolymer or composition described in (a)-(d) above, failing to form fine particles. The heat-resistant resin having Mw of more than $1 \times 10^6$ cannot easily be blended with the homopolymer or composition described in (a)-(d) above.

The heat-resistant resin content is preferably 3 to 30% by mass, more preferably 5 to 25% by mass, based on 100% by mass of the entire heat-resistant polyethylene resin composition. When this content is more than 30% by mass, the membrane has low pin puncture strength, tensile rupture strength and flatness.

Specific examples of the heat-resistant resin include polyesters, polypropylene (PP), polymethylpentene [PMP or TPX (transparent polymer X)], fluororesins, polyamides (PA, melting point: 215 to 265° C.), polyarylene sulfides (PAS), polystyrene (PS, melting point: 230° C.), polyvinyl alcohol (PVA, melting point: 220 to 240° C.), polyimides (PI, Tg: 280° C. or higher), polyamideimides (PAI, Tg: 280° C.), polyethersulfone (PES, Tg: 223° C.), polyetheretherketone (PEEK, melting point: 334° C.), polycarbonates (PC, melting point: 220 to 240° C.), cellulose acetate (melting point: 220° C.), cellulose triacetate (melting point: 300° C.), polysulfone (Tg: 190° C.), polyetherimides (melting point: 216° C.), etc. The heat-resistant resin can be composed of not only a single resin component but also pluralities of resin components.

(1) Polyesters

The polyesters include polybutylene terephthalate (PBT, melting point: about 160 to 230° C.), polyethylene terephthalate (PET, melting point: about 250 to 270° C.), polyethylene naphthalate (PEN, melting point: 272° C.), polybutylene naphthalate (PBN, melting point: 245° C.), etc., and PBT is preferable.

The PBT is essentially a saturated polyester composed of 1,4-butanediol and terephthalic acid. Within ranges not deteriorating properties such as heat resistance, compression resistance, heat shrinkage resistance, etc., other diols than 1,4-butanediol and other carboxylic acids than terephthalic acid can be included as comonomers. Such diols can be, for instance, ethylene glycol, diethylene glycol, neopentyl glycol, 1,4-cyclohexanemethanol, etc. The dicarboxylic acids can be, for instance, isophthalic acid, sebacic acid, adipic acid, azelaic acid, succinic acid, etc. A specific example of PBT resin forming the PBT can be, for instance, a homo-PBT resin commercially available from Toray Industries, Inc. under the tradename of "Toraycon." The PBT can be composed of not only a single component but also pluralities of PBT resin components. The PBT particularly has Mw of $2 \times 10^4$ to $3 \times 10^5$.

(2) Polypropylene

PP can be not only a homopolymer, but also a block or random copolymer containing other α-olefins or diolefins. The other olefins are preferably ethylene or α-olefins having 4 to 8 carbon atoms. The α-olefins having 4 to 8 carbon atoms include, for instance, 1-butene, 1-hexene, 4-methyl-1-pentene, etc. The diolefins preferably have 4 to 14 carbon atoms. The diolefins having 4 to 14 carbon atoms include, for instance, butadiene, 1,5-hexadiene, 1,7-octadiene, 1,9-decadiene, etc. The content of the other olefin or diolefin is preferably less than 10% by mole, based on 100% by mole of the propylene copolymer.

The PP particularly has Mw of $1 \times 10^5$ to $8 \times 10^5$. The molecular weight distribution (Mw/Mn) of the PP is preferably 1.01 to 100, more preferably 1.1 to 50. The PP can be a single substance or a composition of two or more types of PP. The PP preferably has a melting point of 155 to 175° C. Because such PP is dispersed in the form of fine particles having shapes and particle sizes as described above in the polyethylene resin, fibrils constituting the microporous membrane are cleft with fine PP particles as nuclei, thereby providing pores formed by craze-like gaps.

(3) Polymethylpentene

PMP is essentially a polyolefin constituted by any one of 4-methyl-1-pentene, 2-methyl-1-pentene, 2-methyl-2-pentene, 3-methyl-1-pentene and 3-methyl-2-pentene, and a 4-methyl-1-pentene homopolymer is preferable. PMP can be a copolymer containing a small amount of an α-olefin other than methylpentene within a range not deteriorating properties such as heat resistance, compression resistance, heat shrinkage resistance, etc. The α-olefins other than methylpentene are suitably ethylene, propylene, butene-1, pentene-1, hexene-1, octene, vinyl acetate, methyl methacrylate, styrene, etc. PMP usually has a melting point of 230 to 245° C. PMP particularly has Mw of $3 \times 10^5$ to $7 \times 10^5$.

(4) Fluororesins

The fluororesins include polyvinylidene fluoride (PVDF, melting point: 171° C.), polytetrafluoroethylene (PTFE, melting point: 327° C.), a tetrafluoroethylene-perfluoroalkylvinyl ether copolymer (PFA, melting point: 310° C.), a tetrafluoroethylene-hexafluoropropylene-perfluoro(propylvinyl ether) copolymer (EPE, melting point: 295° C.), a tetrafluoroethylene-hexafluoropropylene copolymer (FEP, melting point: 275° C.), an ethylene-tetrafluoroethylene copolymer (ETFE, melting point: 270° C.), etc.

The fluororesin is preferably PVDF. PVDF can be a copolymer (vinylidene fluoride copolymer) with other olefins. The vinylidene fluoride content in the vinylidene fluoride copolymer is preferably 75% or more by mass, more preferably 90% or more by mass. Monomers copolymerizable with vinylidene fluoride include hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate, isopropenyl acetate, etc. The preferred vinylidene fluoride copolymer is a hexafluoropropylene-vinylidene fluoride copolymer.

(5) Polyamides

PA is preferably at least one selected from the group consisting of polyamide 6 (6-nylon), polyamide 66 (6,6-nylon), polyamide 12 (12-nylon) and amorphous polyamide.

(6) Polyarylene Sulfides

PAS is preferably polyphenylene sulfide (PPS) having a melting point of 285° C. PPS can be linear or branched.

(f) Molecular Weight Distribution Mw/Mn

Mw/Mn is a measure of a molecular weight distribution, the larger this value, the wider the molecular weight distribution. Though not critical, the Mw/Mn of the polyethylene resin is preferably 5 to 300, more preferably 10 to 100, when the polyethylene resin is composed of the ultra-high-molecular-weight polyethylene, the other polyethylene, or the polyethylene composition. When the Mw/Mn is less than 5, there are excessive high-molecular weight components, resulting in difficulty in melt extrusion. When the Mw/Mn is more than 300, there are excessive low-molecular weight components, resulting in a microporous membrane with decreased strength. The Mw/Mn of polyethylene (homopolymer or ethylene-α-olefin copolymer) can be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn, the larger difference in Mw between the ultra-high-molecular-weight polyethylene and the other polyethylene, and vice versa. The Mw/Mn of the polyethylene composition can be properly controlled by the molecular weight and percentage of each component.

[2] Production Method of Microporous Polyethylene Membrane (a) First Production Method The first method of this invention for producing a microporous polyethylene membrane comprises the steps of (1) (i) melt-blending the polyethylene resin and the membrane-forming solvent to prepare a polyethylene resin solution A having a resin concentration of 25 to 50% by mass, (ii) melt-blending the polyethylene resin and the membrane-forming solvent to prepare a polyethylene resin solution B having a resin concentration of 10 to 30% by mass, the resin concentration in the polyethylene resin solution B being lower than that in the polyethylene resin solution A, (2) simultaneously extruding the polyethylene resin solutions A and B through a die, (3) cooling the resultant laminate extrudate to provide a gel-like sheet, (4) removing the membrane-forming solvent from the gel-like sheet, and (5) drying the resultant membrane. Before the step (4), if necessary, a stretching step, a heat-setting step, a heat roll treatment step and a hot solvent treatment step can be conducted. After the step (5), a re-stretching step, a hot solvent treatment step, a heat treatment step, a cross-linking step with ionizing radiations, a hydrophilizing step, a surface-coating step, etc. can be conducted.

(1) Preparation of Polyethylene Resin Solution (i) Preparation of Polyethylene Resin Solution A The above polyethylene resin (called "polyethylene resin A" unless otherwise mentioned) and a proper membrane-forming solvent are melt-blended to prepare a polyethylene resin solution A (hereinafter referred to simply as "resin solution A"). The resin solution A can contain various additives such as fillers, antioxidants, ultraviolet absorbents, antiblocking agents, pigments, dyes, etc., if necessary, in ranges not deteriorating the effects of this invention. Fine silicate powder, for instance, can be added as a pore-forming agent.

The membrane-forming solvent can be liquid or solid. The liquid solvents can be aliphatic or cyclic hydrocarbons such as nonane, decane, decalin, p-xylene, undecane, dodecane, liquid paraffin, etc.; and mineral oil distillates having boiling points corresponding to those of the above hydrocarbons. To obtain a gel-like sheet having a stable liquid solvent content, non-volatile liquid solvents such as liquid paraffin are preferable. The solid solvent preferably has melting point of 80° C. or lower. Such solid solvents are paraffin wax, ceryl alcohol, stearyl alcohol, dicyclohexyl phthalate, etc. The liquid solvent and the solid solvent can be used in combination.

The viscosity of the liquid solvent is preferably 30 to 500 cSt, more preferably 50 to 200 cSt, at a temperature of 25° C. When this viscosity is less than 30 cSt, the resin solution A is unevenly extruded through a die lip, resulting in difficulty in blending. The viscosity of more than 500 cSt makes the removal of the liquid solvent difficult.

The fillers can be inorganic or organic fillers. The inorganic fillers include silica, alumina, silica-alumina, zeolite, mica, clay, kaolin, talc, calcium carbonate, calcium oxide, calcium sulfate, barium carbonate, barium sulfate, magnesium carbonate, magnesium sulfate, magnesium oxide, diatomaceous earth, glass powder, aluminum hydroxide, titanium dioxide, zinc oxide, satin white, acid clay, etc. The inorganic fillers can be used alone or in combination. Among them, silica and/or calcium carbonate are preferably used. The organic fillers are preferably made of the above heat-resistant resins.

The shapes of filler particles are not particularly critical, but spherical or pulverized fillers, for instance, can be properly selected, and spherical fillers are preferable. The particle size of the fillers is preferably 0.1 to 15 µm, more preferably 0.5 to 10 µm. The fillers can be surface-treated. Surface-treating agents for the fillers include, for instance, various silane coupling agents, aliphatic acids such as stearic acid or their derivatives, etc.

The use of fillers improves the electrolytic solution absorbability. This appears to be due to the fact that with fillers added, fibrils constituting the microporous membrane are cleft with filler particles as nuclei, thereby forming craze-like gaps (pores) and thus increasing the volume of gaps (pores). It is presumed that filler particles are held in such pores.

The amount of fillers added is preferably 0.1 to 5 parts by mass, more preferably 0.5 to 3 parts by mass, based on 100 parts by mass of the total amount of the polyethylene resin A and the fillers. When this content is more than 5 parts by mass, the membrane has low pin puncture strength and deteriorates deformability by compression, resulting in increased detachment of fillers while slitting. A large amount of powder generated by the detachment of fillers is likely to form defects such as pinholes, specks (impurity), etc. in the microporous membrane products.

Though not particularly critical, uniform melt blending in a double-screw extruder is preferable. This method is suitable for preparing a high-concentration solution of the polyethylene resin A. The melt-blending temperature is preferably the melting point $Tm_a$ of the polyethylene resin $A+10°$ C. to the melting point $Tm_a+100°$ C. The melting point $Tm_a$ of the polyethylene resin A is the melting point of (a) ultra-high-molecular-weight polyethylene, (b) polyethylene other than the ultra-high-molecular-weight polyethylene, or (c) a polyethylene composition, when the polyethylene resin A is any one of (a) to (c). When the polyethylene resin A is (d) a polyolefin composition or (e) a heat-resistant polyethylene resin composition, the melting point $Tm_a$ of the polyethylene resin A is the melting point of the above (a) to (c) contained in (d) the polyolefin composition or (e) the heat-resistant polyethylene resin composition. The ultra-high-molecular-weight polyethylene described in [1] (a) above, the polyethylene other than the ultra-high-molecular-weight polyethylene described in [1] (b) above, and the polyethylene composition described in [1] (c) above have melting points of about 130 to 140° C. Accordingly, the melt-blending temperature is preferably in a range of 140 to 250° C., more preferably in a range of 170 to 240° C.

When the polyethylene resin A is the heat-resistant polyethylene resin composition, the melt-blending temperature is more preferably in a range from the melting point $Tm_a$ of the crystalline, heat-resistant resin or the Tg of the amorphous, heat-resistant resin to the melting point $Tm_a+100°$ C., depending on the type of the heat-resistant resin. For instance, when the heat-resistant resin is PP having a melting point of 155 to 175° C. or PBT having a melting point of about 160 to 230° C., the melt-blending temperature is preferably 160 to 260° C., more preferably 180 to 250° C.

The membrane-forming solvent can be added before starting the melt blending, or charged into the extruder at an intermediate position during the melt blending, though the latter is preferable. In the melt blending, an antioxidant is preferably added to prevent the oxidization of the polyethylene resin A.

A ratio L/D, in which L and D respectively represent the length and diameter of the screws in the double-screw extruder, is preferably 20 to 100, more preferably 35 to 70. When L/D is less than 20, enough melt blending is not achieved. When L/D is more than 100, there is too much residing time for the resin solution A. The screw is not particularly critical but can be of known shape. A cylinder of the double-screw extruder preferably has an inner diameter of 40 to 100 mm.

The resin concentration in the resin solution A is 25 to 50% by mass, preferably 25 to 45% by mass, based on 100% by mass of the total amount of the polyethylene resin A and the membrane-forming solvent. When this resin concentration is less than 25% by mass, the microporous layer A formed by the resin solution A is unlikely to have a dense structure in the resultant microporous membrane. When the resin concentration is more than 50% by mass, the gel-like molding has poor formability.

(ii) Preparation of Polyethylene Resin Solution B

The polyethylene resin solution B (hereinafter referred to simply as "resin solution B") can be the same as described above, except that the resin concentration of the polyethylene resin (referred to as "polyethylene resin B" unless otherwise mentioned) is 10 to 30% by mass based on 100% by mass of the total amount of the polyethylene resin B and the membrane-forming solvent, and lower than that in the resin solution A. Less than 10% by mass of the resin concentration undesirably causes decrease in productivity. In addition, large swelling and neck-in occur at the die exit in the extrusion of the resin solution B, resulting in decrease in the formability and self-supportability of the gel-like molding. More than 30% by mass of this resin concentration makes it difficult to provide the microporous layer B produced from the resin solution B with a coarse structure in the resultant microporous membrane. This resin concentration is preferably 10 to 25% by mass.

The melt-blending temperature is preferably in a range from the melting point $Tm_b$ of the polyethylene resin B+10° C. to the melting point $Tm_b$+100° C. When the polyethylene resin B is (a) the ultra-high-molecular-weight polyethylene, (b) the polyethylene other than the ultra-high-molecular-weight polyethylene, or (c) the polyethylene composition, the melting point $Tm_b$ of the polyethylene resin B is a melting point of any one of them. When the polyethylene resin B is (d) the polyolefin composition or (e) the heat-resistant polyethylene resin composition, the melting point $Tm_b$ is a melting point of any one of (a) to (c) above, which is contained in (d) the polyolefin composition or (e) the heat-resistant polyethylene resin composition. When the polyethylene resin B is the heat-resistant polyethylene resin composition, the melt-blending temperature is more preferably in a range from the melting point $Tm_b$ of the crystalline, heat-resistant resin or the Tg of the amorphous, heat-resistant resin to the melting point $Tm_b$+100° C., depending on the type of the heat-resistant resin.

(iii) Concentration Difference Between Polyethylene Resin Solutions A and B

With the resin solution A having a higher resin concentration than that of the resin solution B, the resultant microporous polyethylene membrane has a gradient structure, in which an average pore diameter in the microporous layer B is larger than that in the microporous layer A. Accordingly, this invention can provide a microporous polyethylene membrane with an average pore diameter changing in a thickness direction, without stretching the gel-like sheet. The resin concentration difference between the resin solutions A and B is preferably 5% or more by mass, more preferably 10% or more by mass.

(2) Extrusion

The melt-blended resin solutions A and B are supplied from separate extruders to a die, through which they are simultaneously extruded. In the simultaneous extrusion of the resin solutions A and B, in which both solutions are combined in a laminar manner in one die and extruded in a sheet form (bonding inside the die), pluralities of extruders are connected to one die. Alternatively, when both solutions are extruded in a sheet form from separate dies and then laminated (bonding outside the die), each extruder is connected to each die. Bonding inside the die is preferable.

In the simultaneous extrusion, either a flat die method or an inflation method can be used. To achieve bonding inside the die in either method, a method of supplying the solutions to each manifold connected to each multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed description will be omitted. For instance, a known flat or inflation die can be used to form a multi-layer membrane. The multi-layer-forming flat die preferably has a gap of 0.1 to 5 mm. When bonding is conducted outside the die by the flat die method, sheet-shaped solutions extruded through each die can be laminated under pressure between a pair of rolls. In any methods described above, the die is heated at a temperature of 140 to 250° C. during extrusion. The extrusion speed of the heated solution is preferably 0.2 to 15 m/minute. The adjustment of the amount of each resin solution A, B extruded can determine a ratio of the microporous layer A to the microporous layer B.

(3) Formation of Gel-Like Sheet

The resultant laminate extrudate is cooled to provide a gel-like sheet. The cooling is preferably conducted to at least a gelation temperature at a speed of 50° C./minute or more. Such cooling provides a fixed microphase separation between the polyethylene resins A and B caused by the membrane-forming solvent. The cooling is preferably conducted to 25° C. or lower. In general, a low cooling speed provides the gel-like sheet with a coarse high-order structure having large pseudo-cell units, while a high cooling speed provides dense cell units. The cooling speed of less than 50° C./minute increases crystallization, making it difficult to form a stretchable gel-like sheet. The cooling method can be a method of bringing the extrudate into contact with a cooling medium such as a cooling air, a cooling water, etc., a method of bring the extrudate into contact with a cooling roll, etc.

When the polyethylene resins A and B are any one of [1] (a)-(e) above, the cooling roll temperature is preferably in a range from Tc-115° C. to Tc, wherein Tc is lower one of the crystallization temperature $Tc_a$ of the polyethylene resin A and the crystallization temperature $Tc_b$ of the polyethylene resin B. The cooling roll temperature exceeding the crystallization temperature Tc fails to provide sufficiently rapid cooling. The cooling roll temperature is more preferably in a range from the crystallization temperature Tc-110° C. to the crystallization temperature Tc-10° C. When the polyethylene resin A, B is (a) the ultra-high-molecular-weight polyethylene, (b) the polyethylene other than the ultra-high-molecular-weight polyethylene, or (c) the polyethylene composition, the crystallization temperature $Tc_a$, $Tc_b$ of the polyethylene resin A, B is a crystallization temperature of any one of (a)-(c). When the polyethylene resin A, B is (d) the polyolefin composition or (e) the heat-resistant polyethylene resin composition, the crystallization temperature $Tc_a$, $Tc_b$ of the polyethylene resin A, B is a crystallization temperature of any one of (a)-(c) above, which is contained in (d) the polyolefin composition or (e) the heat-resistant polyethylene resin composition.

The crystallization temperature is measured according to JIS K7121. The crystallization temperatures of the ultra-high-molecular-weight polyethylene described in [1] (a) above, the polyethylene other than the ultra-high-molecular-weight polyethylene described in [1] (b) above, and the polyethylene composition described in [1] (c) above are generally 102 to 108° C. Accordingly, the cooling roll temperature is in a range from −10° C. to 105° C., preferably in a range from −5° C. to 95° C. The contact time between the cooling roll and the sheet is preferably 1 to 30 seconds, more preferably 2 to 15 seconds.

(4) Removal of Membrane-Forming Solvent

The membrane-forming solvent is removed (washed away) using a washing solvent. Because the phases of the polyethylene resins A and B are separated from the membrane-forming solvent phase, the removal of the membrane-forming solvent provides a microporous membrane composed of fibrils constituting a fine, three-dimensional network structure and having three-dimensionally and irregularly communicating pores (voids). The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a microporous membrane having high porosity and permeability.

The washing of the gel-like sheet can be conducted by a washing-solvent-immersing method, a washing-solvent-showering method, or a combination thereof. The amount of the washing solvent used is preferably 300 to 30,000 parts by mass per 100 parts by mass of the membrane. The washing temperature can usually be 15 to 30° C., and heat-washing can be conducted, if necessary. The heat-washing temperature is preferably 80° C. or lower. Washing with the washing solvent is preferably conducted until the amount of the remaining membrane-forming solvent becomes less than 1% by mass of that added.

(5) Drying of Membrane

The microporous polyethylene membrane obtained by removing the membrane-forming solvent is then dried by a heat-drying method, a wind-drying method, etc. The drying temperature is preferably equal to or lower than a crystal dispersion temperature Tcd, which is a lower one of the crystal dispersion temperature $Tcd_a$ of the polyethylene resin A and the crystal dispersion temperature $Tcd_b$ of the polyethylene resin B, particularly 5° C. or more lower than the crystal dispersion temperature Tcd. When the polyethylene resin A, B is (a) the ultra-high-molecular-weight polyethylene, (b) the polyethylene other than the ultra-high-molecular-weight polyethylene, or (c) the polyethylene composition, the crystal dispersion temperature $Tcd_a$, $Tcd_b$ of the polyethylene resin A, B is a crystal dispersion temperature of (a) to (c) above. When the polyethylene resin A, B is (d) the polyolefin composition, or (e) the heat-resistant polyethylene resin composition, it is a crystal dispersion temperature of (a) to (c) above, which is contained in (d) the polyolefin composition or (e) the heat-resistant polyethylene resin composition. The crystal dispersion temperature is determined by measuring the temperature properties of dynamic viscoelasticity according to ASTM D 4065. The ultra-high-molecular-weight polyethylene in [1] (a) above, the polyethylene other than the ultra-high-molecular-weight polyethylene in [1] (b) above, and the polyethylene composition in [1] (c) have crystal dispersion temperatures in a range of above 90 to 100° C.

Drying is conducted until the percentage of the remaining washing solvent becomes preferably 5% or less by mass, more preferably 3% or less by mass, based on 100% by mass of the microporous membrane (dry weight). Insufficient drying undesirably reduces the porosity of the microporous membrane in subsequent re-stretching and heat treatment steps, thereby resulting in poor permeability.

(6) Optional Steps Before Removal of Membrane-Forming Solvent

Before the step (4) of removing the membrane-forming solvent, any one of a stretching step, a heat-setting step, a heat roll treatment step and a hot solvent treatment step can be conducted.

(i) Stretching

After heating, the gel-like sheet is preferably stretched to a predetermined magnification by a tenter method, a roll method, an inflation method, a rolling method, or their combination. Because the gel-like sheet contains a membrane-forming solvent, it can be uniformly stretched. Although the stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is particularly preferable.

The stretching magnification is preferably 2-fold or more, more preferably 3- to 30-fold in the case of monoaxial stretching. In the case of biaxial stretching, it is at least 3-fold in both directions, with an area magnification of preferably 9-fold or more, more preferably 25-fold or more. The area magnification of less than 9-fold results in insufficient stretching, failing to providing a high-modulus, high-strength microporous membrane. When the area magnification is more than 400-fold, restrictions occur on stretching apparatuses, stretching operations, etc.

The stretching temperature is preferably equal to or lower than a melting point Tm+10° C., more preferably in a range of the crystal dispersion temperature Tcd or more and lower than the melting point Tm, the melting point Tm being lower one of the melting point $Tm_a$ of the polyethylene resin A and the melting point $Tm_b$ of the polyethylene resin B. When this stretching temperature exceeds the melting point Tm+10° C., the resin is molten, so that stretching fails to orient molecular chains. When it is lower than the crystal dispersion temperature Tcd, the resin is insufficiently softened, making it likely that the membrane is broken by stretching, thus failing to achieve high-magnification stretching. As described above, the ultra-high-molecular-weight polyethylene described in [1] (a) above, the polyethylene other than the ultra-high-molecular-weight polyethylene described in [1] (b) above, and the polyethylene composition described in [1] (c) above have crystal dispersion temperatures of about 90 to 100° C. Accordingly, the stretching temperature is usually in a range of 90 to 140° C., preferably in a range of 100 to 130° C.

The above stretching causes cleavage between polyethylene crystal lamellas, making the polyethylene phase (ultra-high-molecular-weight polyethylene phase, polyethylene phase or polyethylene composition phase) finer with larger numbers of fibrils. The fibrils form a three-dimensional network structure (three-dimensionally and irregularly connected network structure). In a layer containing the heat-resistant polyethylene resin composition, fibrils are cleft with fine, heat-resistant resin particles as nuclei, thereby forming craze-like pores holding fine particles.

Depending on the desired properties, stretching can be conducted with a temperature distribution in a thickness direction, to provide a microporous membrane with higher mechanical strength. This method is described specifically in Japanese Patent 3347854.

(ii) Heat-Setting

The gel-like sheet can be heat-set. The heat-setting can change the pore size and porosity of the microporous membrane, and particularly enlarge the pore size of the microporous layer B. The heat-setting is conducted by a tenter method, a roll method or a rolling method. The heat-setting is conducted in a temperature range of the melting point Tm+10° C. or lower, preferably from the crystal dispersion temperature Tcd to the melting point Tm.

(iii) Hot Roll Treatment

At least one surface of the gel-like sheet can be brought into contact with a heat roll (heat roll treatment), to enlarge the pore diameter near the surface. The pore diameter near the surface and the thickness of a layer having enlarged pore diameter can be controlled by adjusting the roll temperature, the contact time of the membrane with the roll, the contact area ratio of the membrane with the roll, etc.

The roll temperature is preferably in a range of the crystal dispersion temperature Tcd+10° C. or higher and lower than the melting point Tm. The heat roll treatment is preferably conducted on the stretched gel-like sheet. The heat-stretched gel-like sheet is preferably cooled to a temperature lower than the crystal dispersion temperature Tcd before contact with the heat roll.

The roll can have a smooth or rough surface. A smooth roll can be a rubber or metal roll. The heat roll can have a function of sucking the gel-like sheet. When the gel-like sheet comes into contact with the heat roll having a heating oil on the surface, high heating efficiency is achieved, and the resultant membrane is provided with a larger average pore diameter near the surface. The heating oil can be the same as the membrane-forming solvent. The use of a suction roll can control the amount of the membrane-forming solvent kept on the roll.

(iv) Hot Solvent Treatment

The gel-like sheet can be treated with a hot solvent. The hot solvent treatment is preferably conducted on the stretched gel-like sheet. Solvents usable for the heat treatment are preferably the above liquid membrane-forming solvents, more preferably liquid paraffin. The heat treatment solvents can be the same as or different from the membrane-forming solvent used for producing the resin solution A or B.

The hot solvent treatment method is not particularly critical as long as the gel-like sheet comes into contact with a hot solvent. It includes, for instance, a method of directly contacting the gel-like sheet with a hot solvent (simply called "direct method" unless otherwise mentioned), a method of contacting the gel-like sheet with a cold solvent and then heating it (simply called, "indirect method" unless otherwise mentioned), etc. The direct method includes a method of immersing the gel-like sheet in a hot solvent, a method of spraying a hot solvent to the gel-like sheet, a method of coating the gel-like sheet with a hot solvent, etc., and the immersing method is preferable. In the indirect method, the gel-like sheet is immersed in a cold solvent, sprayed with a cold solvent, or coated with a cold solvent, and then brought into contact with a heat roll, heated in an oven, or immersed in a hot solvent.

With the temperature and time properly set in the hot solvent treatment, the pore size and porosity of the microporous membrane can be changed. Particularly the pore size in the coarse-structure layer (microporous layer B) can be increased. The hot solvent temperature is preferably in a range from the crystal dispersion temperature Tcd to the melting point Tm+10° C. Specifically, the hot solvent temperature is preferably 110 to 140° C., more preferably 115 to 135° C. The contact time is preferably 0.1 seconds to 10 minutes, more preferably 1 second to 1 minute. When the hot solvent temperature is lower than the crystal dispersion temperature Tcd, or when the contact time is less than 0.1 seconds, the hot solvent treatment has substantially no effect, only with little improvement in the permeability. When the hot solvent temperature is higher than the melting point Tm+10° C., or when the contact time is longer than 10 minutes, the microporous membrane is undesirably provided with decreased strength or broken.

With such hot solvent treatment, fibrils formed by stretching have a leaf-vein-like structure, in which trunk-forming fibers are relatively thick. Accordingly, the microporous membrane having a large pore size and excellent strength and permeability can be obtained. The term "leaf-vein-like fibrils" means that the fibrils have thick trunks and fine fibers spreading from the trunks, forming a complex network structure.

Although the remaining heat treatment solvent is removed by washing after the hot solvent treatment, it can be removed together with the membrane-forming solvent.

(7) Optional Steps After Drying Step

After the drying step (5), a re-stretching step, a heat treatment step, a hot solvent treatment step, a cross-linking step with ionizing radiations, a hydrophilizing step, a surface-coating step, etc. can be conducted.

(i) Re-Stretching

A microporous membrane obtained by washing and drying the stretched gel-like sheet is preferably stretched again in at least one direction. The re-stretching can be conducted by the same tenter method as described above, etc. while heating the membrane. The re-stretching can be monoaxial or biaxial. The biaxial stretching can be simultaneous biaxial stretching or sequential stretching, though the simultaneous biaxial stretching is preferable.

The re-stretching temperature is preferably the melting point Tm or lower, more preferably in a range from the crystal dispersion temperature Tcd to the melting point Tm. When the re-stretching temperature exceeds the melting point Tm, the compression resistance is deteriorated, and there is large unevenness in properties (particularly air permeability) in a width direction when stretched in a transverse direction (TD). When the re-stretching temperature is lower than the crystal dispersion temperature Tcd, the polyethylene resins A and B are insufficiently softened, making it likely that the membrane is broken by stretching, thus failing to achieve uniform stretching. Specifically, the re-stretching temperature is usually in a range of 90 to 135° C., preferably in a range of 95 to 130° C.

The re-stretching magnification in one direction is preferably 1.1- to 2.5-fold, to provide the microporous membrane with increased pore diameter and improved compression resistance. In the case of monoaxial stretching, for instance, it is 1.1- to 2.5-fold in MD or TD. In the case of biaxial stretching, it is 1.1- to 2.5-fold in both MD and TD. As long as the stretching magnification is 1.1- to 2.5-fold in each of MD and TD in biaxial stretching, the stretching magnifications in MD and TD can be different, but are preferably the same. When this magnification is less than 1.1-fold, sufficiently improved compression resistance cannot be obtained. When this magnification is more than 2.5-fold, the membrane is highly likely broken, and undesirably suffers decreased heat shrinkage resistance. The re-stretching magnification is more preferably 1.1- to 2.0-fold.

(ii) Heat treatment

The dried membrane is preferably heat-treated. The heat treatment stabilizes crystals and makes lamellas uniform. The heat treatment can be heat setting and/or annealing. The heat-setting treatment can be the same as described above.

The annealing can be conducted using a belt conveyer or an air-floating furnace in addition to the tenter method, the roll method or the rolling method. The annealing is conducted at a temperature equal to or lower than the melting point Tm, preferably at a temperature in a range from 60° C. to the melting point Tm-10° C. Such annealing provides a high-strength, microporous membrane with good permeability. The heat-setting and the annealing can be combined.

(iii) Hot Solvent Treatment

The dried membrane can be treated with a hot solvent. The hot solvent treatment can be the same as described above.

(iv) Cross-Linking of Membrane

The dried microporous membrane can be cross-linked by ionizing radiation of α-rays, β-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous polyethylene membrane.

(v) Hydrophilizing

The dried microporous membrane can be hydrophilized. The hydrophilizing treatment can be a monomer-grafting treatment, a surfactant treatment, a corona-discharging treatment, etc. The monomer-grafting treatment is preferably conducted after cross-linking.

In case of the surfactant treatment, any of nonionic surfactants, cationic surfactants, anionic surfactants and amphoteric surfactants can be used, but the nonionic surfactants are preferable. The microporous membrane is dipped in a solution of the surfactant in water or a lower alcohol such as methanol, ethanol, isopropyl alcohol, etc., or coated with the solution by a doctor blade method.

(vi) Surface-Coating

The dried microporous membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000, and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The coating layer can be formed, for instance, by coating the microporous membrane with a mixed solution containing the above coating resin and its good solvent, removing the good solvent to increase the concentration of the resin, thereby forming a structure in which a resin phase is separated from a good solvent phase, and removing the remaining good solvent.

(b) Second Production Method

The second production method comprises the steps of (1) preparing the above resin solutions A and B such that the resin solution A has a higher concentration than that of the resin solution B, (2) extruding the resin solutions A and B through separate dies, (3) cooling the resultant extrudates to provide gel-like sheets A and B, (4) removing the membrane-forming solvent from the gel-like sheets A and B, (5) drying the resultant microporous polyethylene membranes A and B, and (6) alternately laminating them. Before the step (4) of removing the membrane-forming solvent, if necessary, a step of stretching the gel-like sheets A and B, a heat-setting step, a heat roll treatment step and a hot solvent treatment step can be conducted. Further, after the laminating step (6), a re-stretching step, a heat treatment step, a hot solvent treatment step, a cross-linking step, a hydrophilizing step, a surface-coating step, etc. can be conducted.

Among the above steps, the step (1) can be the same as in the first method, the step (2) can be the same as in the first method except for extruding the resin solutions A and B through separate dies, the step (3) can be the same as in the first method except for forming separate gel-like sheets A and B, the step (4) can be the same as in the first method except for removing the membrane-forming solvent from separate gel-like sheets A and B, and the step (5) can be the same as in the first method except for drying separate microporous polyethylene membranes A and B. It should be noted that in the step (5), the drying temperatures of the microporous membranes A and B are preferably equal to or lower than the crystal dispersion temperatures $Tcd_a$ and $Tcd_b$, respectively. The drying temperatures are more preferably lower than the crystal dispersion temperatures $Tcd_a$ and $Tcd_b$ by 5° C. or more.

The stretching step, the heat-setting step, the heat roll treatment step and the hot solvent treatment step before the step (4) can be the same as in the first method except that they are conducted on the gel-like sheet A or B. However, when the gel-like sheet A is stretched before the step (4), the stretching temperature is preferably in a range of the melting point $Tm_a+10°$ C. or lower, more preferably in a range of the crystal dispersion temperature $Tcd_a$ or higher and lower than the melting point $Tm_a$. When the gel-like sheet B is stretched, the stretching temperature is preferably in a range of the melting point $Tm_b+10°$ C. or lower, more preferably in a range of the crystal dispersion temperature $Tcd_b$ or higher and lower than the melting point $Tm_b$.

When the gel-like sheet A is heat-set before the step (4), the heat-setting temperature is preferably in a range of the melting point $Tm_a+10°$ C. or lower, more preferably in a range from the crystal dispersion temperature $Tcd_a$ to the melting point $Tm_a$. When the gel-like sheet B is heat-set, the heat-setting temperature is preferably in a range of the melting point $Tm_b+10°$ C. or lower, more preferably in a range from the crystal dispersion temperature $Tcd_b$ to the melting point $Tm_b$.

When the gel-like sheet A is subjected to a heat roll treatment before the step (4), the roll temperature is preferably in a range of the crystal dispersion temperature $Tcd_a+10°$ C. or higher and lower than the melting point $Tm_a$. When the gel-like sheet B is treated, the roll temperature is more preferably in a range of the crystal dispersion temperature $Tcd_b+10°$ C. or higher and lower than the melting point $Tm_b$.

When the gel-like sheet A is subjected to a hot solvent treatment before the step (4), the hot solvent temperature is preferably in a range from the crystal dispersion temperature $Tcd_a$ to the melting point $Tm_a+10°$ C. When the gel-like sheet B is treated, the hot solvent temperature is preferably in a range from the crystal dispersion temperature $Tcd_b$ to the melting point $Tm_b+10°$ C.

The step (6) of alternately laminating the microporous polyethylene membranes A and B will be described below. Though not particularly critical, the laminating method is preferably a heat-laminating method. The heat-laminating method includes a heat-sealing method, an impulse-sealing method, an ultrasonic laminating method, etc., and the heat-sealing method is preferable. The heat-sealing method preferably uses a heat roll. In the heat roll method, the first and second microporous polyethylene membranes that are overlapped are heat-sealed by passing through a pair of heat rolls or between a heat roll and a table. The heat-sealing temperature and pressure are not particularly critical, as long as the microporous polyethylene membranes are sufficiently bonded, and unless the resultant microporous membrane has poor properties. The heat-sealing temperature is, for instance, 90 to 135° C., preferably 90 to 115° C. The heat-sealing pressure is preferably 0.01 to 50 MPa.

The re-stretching step, the heat treatment step, the hot solvent treatment step, the cross-linking step, the hydrophilizing step and the surface-coating step after the step (6) can be the same as in the first method.

[3] Structure and Properties of Microporous Polyethylene Membrane

The microporous polyethylene membrane produced by the method of this invention has a gradient structure in which the microporous layer B formed by the resin solution B has an larger average pore diameter than that of the microporous layer A formed by the resin solution A, so that the average pore diameter changes in a thickness direction. The average pore diameter of the microporous layer B is preferably 1.1-fold or more of that of the microporous layer A.

The microporous polyethylene membrane produced by the method of this invention comprises a microporous layer B that undergoes large deformation when compressed and has small permeability variation, and a microporous layer A that undergoes small deformation when compressed. Accordingly, when the microporous polyethylene membrane is used as a battery separator, the microporous layer B follows the expansion and shrinkage of electrodes while keeping permeability, and the microporous layer A prevents short-circuiting between the electrodes.

Although the microporous polyethylene membrane usually has a laminar structure, it can substantially be a single-layer membrane in which the microporous layers A and B are fused in their interface, as long as the average pore diameter changes in the thickness direction. The number of layers in the microporous polyethylene membrane is not particularly critical. The arrangement of the microporous layer A and the microporous layer B is not particularly critical, as long as the layers A and B are alternate. In the case of a three-layer microporous membrane, for instance, the layer arrangement can be A/B/A or B/A/B.

The thickness ratio of the microporous layer A to the microporous layer B is not particularly critical, but can be properly selected depending on the applications of the microporous membrane. Adjusting the thickness ratio of the microporous layers A and B can control balance between the compression resistance and the electrolytic solution absorbability. When used as a battery separator, the cross section area ratio of the microporous layer B to the microporous layer A is preferably 0.1 to 2.5. When this ratio is less than 0.1, the microporous membrane undergoes large air permeability change when compressed, while having poor electrolytic solution absorbability. When it is more than 2.5, the microporous membrane has low mechanical strength.

When used as a liquid filter, the microporous layer A acts as a support layer, and the microporous layer B acts as a filtering layer. Adjusting the thickness ratio of the microporous layers A and B can control balance between the filtering properties and the permeability. This invention provides filters having well-balanced filtering properties and permeability even if they are made thinner than conventional ones.

The shape of penetrating pores is not particularly critical. For instance, a two-layer, microporous membrane having a layer structure of A/B can have tapered penetrating pores having large openings on one surface, and their sizes are gradually decreasing toward the opposite surface. A three-layer microporous membrane having a layer structure of B/A/B, for instance, can have penetrating pores whose sizes are gradually decreasing from both surfaces toward the center of the membrane.

The microporous polyethylene membrane according to a preferred embodiment of this invention has the following properties.

(a) Porosity of 25 to 80%

With the porosity of less than 25%, the microporous polyethylene membrane does not have good air permeability. When the porosity exceeds 80%, the microporous polyethylene membrane used as a battery separator does not have enough strength, resulting in a high likelihood of short-circuiting between electrodes.

(b) Air Permeability of 20 to 500 Seconds/100 cm$^3$ (converted to Value at 20-μm Thickness)

When the air permeability is in a range from 20 to 500 seconds/100 cm$^3$, batteries having separators formed by the microporous polyethylene membrane have large capacity and good cycle properties. When the air permeability exceeds 500 seconds/100 cm$^3$, the batteries have small capacity. On the other hand, when the air permeability is less than 20 seconds/100 cm$^3$, shutdown does not fully occur when the temperature is elevated in the batteries.

(c) Pin Puncture Strength of 1,000 mN/20 μm or More

With the pin puncture strength of less than 1,000 mN/20 μm, a battery comprising the microporous polyethylene membrane as a separator likely suffers short-circuiting between electrodes. The pin puncture strength is preferably 2,000 mN/20 μm or more.

(d) Tensile Rupture Strength of 70,000 kPa or More

With the tensile rupture strength of 70,000 kPa or more in both longitudinal direction (MD) and transverse direction (TD), the membrane is unlikely ruptured when used as a battery separator.

(e) Tensile Rupture Elongation of 100% or More

With the tensile rupture elongation of 100% or more in both longitudinal direction (MD) and transverse direction (TD), the membrane is unlikely ruptured when used as a battery separator.

(f) Heat Shrinkage Ratio of 30% or Less

The heat shrinkage ratio is 30% or less in both longitudinal direction (MD) and transverse direction (TD) after exposed to 105° C. for 8 hours. When used as a battery separator, this heat shrinkage ratio is preferably 15% or less, more preferably 10% or less.

(g) Thickness Change Ratio of 10% or More by Heat Compression

The thickness change ratio by heat compression at a temperature of 90° C. and a pressure of 2.2 MPa (22 kgf/cm$^2$) for 5 minutes is 10% or more, based on 100% of the thickness before compression. With the thickness change ratio of 10% or more, a battery separator formed by the microporous membrane can well absorb the expansion of electrodes. This thickness change ratio is preferably 12% or more.

(h) Post-Compression Air Permeability of 1,000 Sec/100 cm$^3$ or Less

The post-compression air permeability (Gurley value) measured after heat compression under the above conditions is 1,000 sec/100 cm$^3$ or less. With the post-compression air permeability of 1,000 sec/100 cm$^3$ or less, a separator formed by the microporous membrane provides a battery with large capacity and good cycle properties. The post-compression air permeability is preferably 900 sec/100 cm$^3$ or less.

(i) Shutdown Temperature of 140° C. or Lower

When the shutdown temperature exceeds 140° C., a lithium battery separator formed by the microporous membrane has low shutdown response when overheated.

(j) Meltdown Temperature of 160° C. or Higher

The meltdown temperature is preferably 165° C. or higher.

[4] Battery Separator

The microporous polyethylene membrane formed by the above method has excellent mechanical properties, heat shrinkage resistance and thermal properties with small air permeability change when compressed, suitable for battery separators. Particularly the microporous membrane obtained by the second method has excellent heat shrinkage resistance. Though properly selectable depending on the types of batteries, the thickness of the battery separator is preferably 5 to 50 μm, more preferably 10 to 35 μm.

[5] Battery

The microporous polyethylene membrane of this invention can be used preferably as a separator for secondary batteries such as lithium secondary batteries, lithium polymer secondary batteries, nickel-hydrogen batteries, nickel-cadmium batteries, nickel-zinc batteries, silver-zinc batteries, etc., particularly as a separator for lithium secondary batteries. Taking the lithium secondary battery for example, description will be made below.

The lithium secondary battery comprises a cathode and an anode laminated via a separator, the separator containing an electrolytic solution (electrolyte). The electrode can be of any known structure, not particularly critical. The electrode structure can be, for instance, a coin type in which disc-shaped cathode and anode are opposing, a laminate type in which planar cathode and anode are alternately laminated, a toroidal type in which ribbon-shaped cathode and anode are wound, etc.

The cathode usually comprises (a) a current collector, and (b) a cathodic active material layer capable of absorbing and discharging lithium ions, which is formed on the current collector. The cathodic active materials can be inorganic compounds such as transition metal oxides, composite oxides of lithium and transition metals (lithium composite oxides), transition metal sulfides, etc. The transition metals can be V, Mn, Fe, Co, Ni, etc. Preferred examples of the lithium composite oxides are lithium nickelate, lithium cobaltate, lithium manganate, laminar lithium composite oxides having an $\alpha$-NaFeO$_2$ structure, etc. The anode comprises (a) a current collector, and (b) an anodic active material layer formed on the current collector. The anodic active materials can be carbonaceous materials such as natural graphite, artificial graphite, cokes, carbon black, etc.

The electrolytic solutions can be obtained by dissolving lithium salts in organic solvents. The lithium salts can be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts can be used alone or in combination. The organic solvents can be organic solvents having high boiling points and high dielectric constants such as ethylene carbonate, propylene carbonate, ethylmethyl carbonate, $\gamma$-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, etc. These organic solvents can be used alone or in combination. Because organic solvents having high dielectric constants have high viscosity, while those having low viscosity have low dielectric constants, their mixtures are preferably used.

When the battery is assembled, the separator can be impregnated with the electrolytic solution, so that the separator (microporous polyethylene membrane) is provided with ion permeability. The impregnation treatment can be (and usually is) conducted by immersing the microporous membrane in the electrolytic solution at room temperature. When a cylindrical battery is assembled, for instance, a cathode sheet, a separator formed by the microporous membrane, and an anode sheet are laminated in this order, and the resultant laminate is wound to a toroidal-type electrode assembly. The resulting electrode assembly can be charged into a battery can and impregnated with the above electrolytic solution. The resulting electrode assembly can be charged into a battery can and impregnated with the above electrolytic solution. A battery lid acting as a cathode terminal equipped with a safety valve can be caulked to the battery can via a gasket to produce a battery.

This invention will be described in more detail with reference to Examples below without intention of restricting the scope of this invention.

Example 1

The resin compositions A and B shown in Table 1 were prepared to produce a microporous polyethylene membrane.

(1) Preparation of Resin Solution A

Dry-blended were 100 parts by mass of a polyethylene (PE) composition comprising 18% by mass of ultra-high-molecular-weight polyethylene (UHMWPE) having a mass-average molecular weight (Mw) of $2.0 \times 10^6$, and 82% by mass of high-density polyethylene (HDPE) having Mw of $3.5 \times 10^5$, with 0.2 parts by mass of tetrakis [methylene-3-(3,5-ditertiary-butyl-4-hydroxyphenyl)-propionate] methane as an antioxidant. Measurement revealed that the polyethylene composition comprising UHMWPE and HDPE had a melting point of 135° C., a crystal dispersion temperature of 100° C., Mw of $6.4 \times 10^5$, and Mw/Mn of 21.0.

The Mws of the UHMWPE, the HDPE and the PE composition were measured by gel permeation chromatography (GPC) under the following conditions.

Measurement apparatus: GPC-150C available from Waters Corporation,

Column: Shodex UT806M available from Showa Denko K.K.,

Column temperature: 135° C.,

Solvent (mobile phase): o-dichlorobenzene,

Solvent flow rate: 1.0 ml/minute,

Sample concentration: 0.1% by mass (dissolved at 135° C. for 1 hour),

Injected amount: 500 μl,

Detector: Differential Refractometer available from Waters Corp., and

Calibration curve: Produced from a calibration curve of a single-dispersion, standard polystyrene sample using a predetermined conversion constant.

40 parts by mass of the resultant mixture was charged into a strong-blending, double-screw extruder having an inner diameter of 58 mm and L/D of 42, and 60 parts by mass of liquid paraffin [35 cst (40° C.)] was supplied to the double-screw extruder via its side feeder. Melt-blending was conducted at 230° C. and 250 rpm to prepare a resin solution A.

(2) Preparation of Resin Solution B

A resin solution B was prepared in the same manner as above except for changing the polyethylene composition concentration to 20% by mass.

(3) Formation of Membrane

The resin solutions A and B were supplied from separate double-screw extruders to a three-layer-forming T-die, and extruded through the T-die such that the solution B, the solution A and the solution B were laminated at a layer thickness ratio B/A/B of 1/1/1. The extrudate was cooled by drawing by a cooling roll controlled at 0° C, thereby obtaining a three-layer, gel-like sheet. Using a tenter-stretching machine, the three-layer, gel-like sheet was simultaneously and biaxially stretched at 117.5° C., such that the stretching magnification was 5-fold in both longitudinal direction (MD) and transverse direction (TD). Fixed to an aluminum frame plate of 20 cm×20 cm, the stretched three-layer, gel-like sheet was immersed in a washing bath of methylene chloride controlled at 25° C., and washed with the vibration of 100 rpm for 3 minutes to remove the liquid paraffin. The washed membrane was air-dried at room temperature, and fixed to the tenter to conduct a heat-setting treatment at 128° C. for 10 minutes, thereby producing a microporous polyethylene membrane.

Example 2

A microporous polyethylene membrane was produced in the same manner as in Example 1, except that a three-layer, gel-like sheet was washed and then stretched to 1.4-fold in TD at 129° C., and that the heat-setting temperature was 129° C.

Example 3

(1) Preparation of Resin Solution A

A resin solution A having a concentration of 40% by mass was prepared in the same manner as in Example 1 except for using a PE composition (melting point: 135° C., crystal dispersion temperature: 100° C., Mw: $9.3 \times 10^5$, and Mw/Mn: 24.5) comprising 35% by mass of UHMWPE and 65% by mass of HDPE.

(2) Preparation of Resin Solution B

A resin solution B having a UHMWPE/HDPE mass ratio of 18/82 was prepared in the same manner as in Example 1, except that the PE composition concentration was 15% by mass.

(3) Formation of Membrane

The resin solutions A and B were supplied from separate double-screw extruders to a three-layer-forming T-die, and were extruded through the T-die, such that the solution A, the solution B and the solution A were laminated in this order at a thickness ratio A/B/A of 1/1/1. The extrudate was cooled while drawing by a cooling roll controlled at 0° C., thereby providing a three-layer, gel-like sheet. Using a tenter-stretching machine, the three-layer, gel-like sheet was simultaneously and biaxially stretched at 115° C., such that the stretching magnification was 5-fold in both longitudinal direction (MD) and transverse direction (TD). The stretched, three-layer, gel-like sheet was washed and air-dried in the same manner as in Example 1. The dried membrane was stretched to 1.4-fold in TD by a tenter at 128.5° C., and at 128.5° C. for 10 minutes to produce a microporous polyethylene membrane.

Example 4

A microporous polyethylene membrane was produced in the same manner as in Example 3, except that the layer thickness ratio of the solution A, the solution B and the solution A in the extrudate was 2/1/2.

Example 5

(1) Preparation of Resin Solution A

A resin solution A having a concentration of 40% by mass was prepared in the same manner as in Example 1, except for using a PE composition (melting point: 135° C., crystal dispersion temperature: 100° C., Mw: $4.3 \times 10^5$, and Mw/Mn: 16.0) comprising 5% by mass of UHMWPE and 95% by mass of HDPE.

(2) Preparation of Resin Solution B

A resin solution B was prepared in the same manner as in the above resin solution A, except that the PE composition concentration was 20% by mass.

(3) Formation of Membrane

The resin solutions A and B were supplied from separate double-screw extruders to a three-layer-forming T-die, and extruded through the T-die such that the solution A, the solution B and the solution A were laminated in this order at a layer thickness ratio A/B/A of 1/1/1. The resultant extrudate was cooled while drawing by a cooling roll controlled at 0° C., thereby providing a three-layer, gel-like sheet. Using a tenter-stretching machine, the three-layer, gel-like sheet was simultaneously and biaxially stretched at 117.5° C., such that the stretching magnification was 5-fold in both longitudinal direction (MD) and transverse direction (TD). The stretched, three-layer, gel-like sheet was washed and air-dried in the same manner as in Example 1. The dried membrane was stretched to 1.4-fold in TD by a tenter at 129° C., and heat-set at 129° C. for 10 minutes to produce a microporous polyethylene membrane.

Example 6

(1) Preparation of Resin Solution A

A resin solution A having a resin concentration of 40% by mass was prepared in the same manner as in Example 1 except for using a composition comprising 5% by mass of UHMWPE, 90% by mass of HDPE, and 5% by mass of PP having Mw of $5.3 \times 10^5$, the PE composition of UHMWPE and HDPE having melting point of 135° C., a crystal dispersion temperature of 100° C., Mw of $4.4 \times 10^5$, and Mw/Mn of 16.0.

(2) Preparation of Resin Solution B

A resin solution B was prepared in the same manner as in the above resin solution A except for changing the resin concentration to 20% by mass.

(3) Formation of Membrane

A microporous polyethylene membrane was produced in the same manner as in Example 5, except for using the resultant resin solutions A and B.

Example 7

A microporous polyethylene membrane was produced in the same manner as in Example 6 except for using PBT having Mw of $3.8 \times 10^4$ in place of PP.

Example 8

A microporous polyethylene membrane was produced in the same manner as in Example 3, except that the simultaneously and biaxially stretched, three-layer, gel-like sheet was heat-set at 122° C. for 10 minutes and then washed, and that the re-stretching and heat-setting were conducted at a temperature of 129.5° C.

Example 9

A microporous polyethylene membrane was produced in the same manner as in Example 3, except that the simultaneously and biaxially stretched, three-layer, gel-like sheet was immersed in a liquid paraffin bath controlled at 120° C. for 3 seconds and then washed, and that the re-stretching and heat-setting were conducted at a temperature of 130° C.

Example 10

(1) Production of Microporous Polyethylene Membrane A

A resin solution A having a resin concentration of 40% by mass was prepared in the same manner as in Example 1, except for using a PE composition (melting point: 135° C., crystal dispersion temperature: 100° C., Mw: $4.3 \times 10^5$, and Mw/Mn: 16.0) comprising 5% by mass of UHMWPE and 95% by mass of HDPE. The resin solution A was extruded from a T-die attached to a tip end of the double-screw extruder, and cooled while drawing by a cooling roll controlled at 0° C., thereby forming a gel-like sheet A. The gel-like sheet A was simultaneously and biaxially stretched to 5-fold in both longitudinal direction (MD) and transverse direction (TD) at 116° C. by a tenter-stretching machine, and then washed and air-dried in the same manner as in Example 1 to produce a microporous polyethylene membrane A.

(2) Production of Microporous Polyethylene Membrane B

A resin solution B was prepared in the same manner as in the above resin solution A, except that a PE composition (melting point: 135° C., crystal dispersion temperature: 100° C., Mw: 6.4×10$^5$, and Mw/Mn: 21.0) comprising 18% by mass of UHMWPE and 82% by mass of HDPE was used, and that the resin concentration was 20% by mass. A microporous polyethylene membrane B was produced in the same manner as in the above microporous polyethylene membrane A except for using the resin solution B.

(3) Lamination and Heat-Setting Treatment

The microporous polyethylene membranes A and B were laminated by passing through a pair of rolls at a temperature of 110° C. and a pressure of 0.05 MPa. The resultant laminate was heat-set at a temperature of 126° C. by a tenter method to produce a microporous polyethylene membrane, in which a layer thickness ratio of the membrane A to the membrane B was 1/1.

Example 11

(1) Preparation of Resin Solution A

A resin solution A was prepared in the same manner as in Example 1, except that a PE composition (melting point: 135° C., crystal dispersion temperature: 100° C., Mw: 8.2×10$^5$, and Mw/Mn: 23.5) comprising 30% by mass of UHMWPE and 70% by mass of HDPE was used, and that the resin concentration was 30% by mass.

(2) Preparation of Resin Solution B

A resin solution B having a mass ratio UHMWPE/HDPE of 18/82 was prepared in the same manner as in Example 1, except that the resin concentration was 15% by mass.

(3) Formation of Membrane

The resin solutions A and B were supplied from separate double-screw extruders to a two-layer-forming T-die, and extruded through the T-die in the form of a laminate of the solution A and the solution B at a layer thickness ratio A/B of 1/1. The extrudate was cooled while drawing by a cooling roll controlled at 0° C., thereby providing a two-layer, gel-like sheet. Using a tenter-stretching machine, the two-layer, gel-like sheet was simultaneously and biaxially stretched to 5-fold in both longitudinal direction (MD) and transverse direction (TD) at 119.2° C. The stretched, two-layer, gel-like sheet was washed and air-dried in the same manner as in Example 1. The dried membrane stretched to 1.4-fold by a tenter in TD at 110° C., and heat-set at 110° C. for 10 minutes to produce a microporous polyethylene membrane.

Example 12

Resin solutions A and B were prepared in the same manner as in Example 11. The resin solutions A and B were extruded from separate T-dies each attached to a tip end of each double-screw extruder, and cooled while drawing by a cooling roll controlled at 0° C., thereby providing gel-like sheets A and B. The gel-like sheets A and B were simultaneously and biaxially stretched to 5-fold in both longitudinal direction (MD) and transverse direction (TD) 119.2° C. by a tenter-stretching machine. The stretched gel-like sheets A and B were washed and air-dried in the same manner as in Example 1 to produce microporous polyethylene membranes A and B. The microporous polyethylene membranes A and B were laminated by passing through a pair of rolls at a temperature of 110° C. and a pressure of 0.05 MPa. The resultant laminate was stretched to 1.4-fold in TD at a temperature of 110° C. by a tenter, and heat-set at a temperature of 120° C. for 10 minutes to produce a microporous polyethylene membrane having a layer thickness ratio A/B of 1/1.

Example 13

A resin solution A having a mass ratio UHMWPE/HDPE of 5/95 was prepared in the same manner as in Example 10 except for changing the resin concentration to 30% by mass. A resin solution B having a mass ratio UHMWPE/HDPE of 18/82 was prepared in the same manner as in Example 10. The resin solutions A and B were supplied from separate double-screw extruders to a two-layer-forming T-die, and extruded through the T-die such that the solution A and the solution B were laminated at a layer thickness ratio A/B of 1/1. The resultant extrudate was cooled while drawing by a cooling roll controlled at 90° C., thereby providing a two-layer, gel-like sheet. The two-layer, gel-like sheet was washed and air-dried in the same manner as in Example 1, and heat-set at 125° C. for 10 minutes to produce a microporous polyethylene membrane.

Example 14

Resin solutions A and B were prepared in the same manner as in Example 13. The resin solution A was extruded from a T-die attached to a tip end of a double-screw extruder, and cooled while drawing by a cooling roll controlled at 90° C., thereby providing a gel-like sheet A. The resin solution B was extruded from a T-die attached to a tip end of another double-screw extruder, and cooled while drawing by a cooling roll controlled at 60° C., thereby providing a gel-like sheet B. The gel-like sheets A and B were washed and air-dried in the same manner as in Example 1 to produce microporous polyethylene membranes A and B. The microporous polyethylene membranes A and B were laminated by passing through a pair of rolls at a temperature of 110° C. and at a pressure of 0.05 MPa, and heat-set at 128° C. for 10 minutes to produce a microporous polyethylene membrane having a layer thickness ratio A/B of 1/1.

Comparative Example 1

A resin solution was prepared in the same manner as in Example 1, except that a PE composition (melting point: 135° C., crystal dispersion temperature: 100° C., Mw: 6.8×10$^5$, and Mw/Mn: 20.0) comprising 20% by mass of UHMWPE and 80% by mass of HDPE was used, and that the resin concentration was 30% by mass. The resin solution was extruded from a T-die attached to a tip end of a double-screw extruder, and cooled while drawing by a cooling roll controlled at 0° C., thereby providing a gel-like sheet. The gel-like sheet was simultaneously and biaxially stretched to 5-fold in both longitudinal direction (MD) and transverse direction (TD) at 115° C. by a tenter-stretching machine. The stretched gel-like sheet was washed and air-dried in the same manner as in Example 1. Fixed to a tenter, the dried membrane was heat-set at 125° C. for 10 minutes to produce a microporous polyethylene membrane.

Comparative Example 2

Two resin solutions were prepared in the same manner as in Example 1 except for using resin concentrations of 30% by mass and 28% by mass, respectively. A microporous polyethylene membrane was produced in the same manner as in Example 1, except that the above resin solutions were used, that simultaneous biaxial stretching was conducted at 115° C., that the three-layer, gel-like sheet was washed and then stretched to 1.4-fold in TD at 124° C., and that the heat-setting temperature was 124° C.

TABLE 1

| No. | | Example 1 | Example 2 | Example 3 | Example 4 |
|---|---|---|---|---|---|
| Composition of Resin | | | | | |
| Resin Composition A | | | | | |
| UHMWPE | $Mw^{(1)}$/% by mass | $2.0 \times 10^6$/18 | $2.0 \times 10^6$/18 | $2.0 \times 10^6$/35 | $2.0 \times 10^6$/35 |
| HDPE | $Mw^{(1)}$/% by mass | $3.5 \times 10^5$/82 | $3.5 \times 10^5$/82 | $3.5 \times 10^5$/65 | $3.5 \times 10^5$/65 |
| Heat-Resistant Resin | Type | — | — | — | — |
| | $Mw^{(1)}$/% by mass | —/— | —/— | —/— | —/— |
| PE composition | | | | | |
| $Mw^{(1)}$ | | $6.4 \times 10^5$ | $6.4 \times 10^5$ | $9.3 \times 10^5$ | $9.3 \times 10^5$ |
| $Mw/Mn^{(2)}$ | | 21.0 | 21.0 | 24.5 | 24.5 |
| Melting Point (° C.) | | 135 | 135 | 135 | 135 |
| Crystal Dispersion Temp. (° C.) | | 100 | 100 | 100 | 100 |
| Resin Composition B | | | | | |
| UHMWPE | $Mw^{(1)}$/% by mass | $2.0 \times 10^6$/18 | $2.0 \times 10^6$/18 | $2.0 \times 10^6$/18 | $2.0 \times 10^6$/18 |
| HDPE | $Mw^{(1)}$/% by mass | $3.5 \times 10^5$/82 | $3.5 \times 10^5$/82 | $3.5 \times 10^5$/82 | $3.5 \times 10^5$/82 |
| Heat-Resistant Resin | Type | — | — | — | — |
| | $Mw^{(1)}$/% by mass | —/— | —/— | —/— | —/— |
| PE composition | | | | | |
| $Mw^{(1)}$ | | $6.4 \times 10^5$ | $6.4 \times 10^5$ | $6.4 \times 10^5$ | $6.4 \times 10^5$ |
| $Mw/Mn^{(2)}$ | | 21.0 | 21.0 | 21.0 | 21.0 |
| Melting Point (° C.) | | 135 | 135 | 135 | 135 |
| Crystal Dispersion Temp. (° C.) | | 100 | 100 | 100 | 100 |
| Production Conditions | | | | | |
| Conc. (% by mass) of A and $B^{(3)}$ Extrudate | | $40/20^{(4)}$ | 40/20 | 40/15 | 40/15 |
| Layer $Structure^{(5)}$ | | B/A/B | B/A/B | A/B/A | A/B/A |
| Layer Thickness Ratio | | 1/1/1 | 1/1/1 | 1/1/1 | 2/1/2 |
| Stretching Multi-Layer, Gel-Like Sheet | | | | | |
| Temp. (° C.)/(MD × $TD)^{(6)}$ Gel-Like Sheet A | | 117.5/5 × 5 | 117.5/5 × 5 | 115/5 × 5 | 115/5 × 5 |
| Temp. (° C.)/(MD × $TD)^{(6)}$ Gel-Like Sheet B | | —/— | —/— | —/— | —/— |
| Temp. (° C.)/(MD × $TD)^{(6)}$ Heat-Setting of Gel-Like Sheet | | —/— | —/— | —/— | —/— |
| Temp. (° C.)/Time (minute) Hot Solvent $Treatment^{(7)}$ | | —/— | —/— | —/— | —/— |
| Solvent | | — | — | — | — |
| Temp. (° C.)/Time (sec.) Lamination | | —/— | —/— | —/— | —/— |
| Temp. (° C.)/Pressure (MPa) | | —/— | —/— | —/— | —/— |
| Layer $Structure^{(8)}$ | | — | — | — | — |
| Layer Thickness Ratio Re-Stretching | | — | — | — | — |
| Temp. (° C.)/Direction/Magnification Heat-Setting | | —/—/— | 129/TD/1.4 | 128.5/TD/1.4 | 128.5/TD/1.4 |
| Temp. (° C.)/Time (minute) | | 128/10 | 129/10 | 128.5/10 | 128.5/10 |

| No. | | Example 5 | Example 6 | Example 7 | Example 8 |
|---|---|---|---|---|---|
| Composition of Resin | | | | | |
| Resin Composition A | | | | | |
| UHMWPE | $Mw^{(1)}$/% by mass | $2.0 \times 10^6$/5 | $2.0 \times 10^6$/5 | $2.0 \times 10^6$/5 | $2.0 \times 10^6$/35 |
| HDPE | $Mw^{(1)}$/% by mass | $3.5 \times 10^5$/95 | $3.5 \times 10^5$/90 | $3.5 \times 10^5$/90 | $3.5 \times 10^5$/65 |
| Heat-Resistant Resin | Type | — | PP | PBT | — |
| | $Mw^{(1)}$/% by mass | —/— | $5.3 \times 10^5$/5 | $3.8 \times 10^4$/5 | —/— |
| PE composition | | | | | |
| $Mw^{(1)}$ | | $4.3 \times 10^5$ | $4.4 \times 10^5$ | $4.4 \times 10^5$ | $9.3 \times 10^5$ |
| $Mw/Mn^{(2)}$ | | 16.0 | 16.0 | 16.0 | 24.5 |
| Melting Point (° C.) | | 135 | 135 | 135 | 135 |
| Crystal Dispersion Temp. (° C.) | | 100 | 100 | 100 | 100 |

TABLE 1-continued

| | | | | | |
|---|---|---|---|---|---|
| Resin Composition B | | | | | |
| UHMWPE | Mw$^{(1)}$/% by mass | 2.0 × 10$^6$/5 | 2.0 × 10$^6$/5 | 2.0 × 10$^6$/5 | 2.0 × 10$^6$/18 |
| HDPE | Mw$^{(1)}$/% by mass | 3.5 × 10$^5$/95 | 3.5 × 10$^5$/90 | 3.5 × 10$^5$/90 | 3.5 × 10$^5$/82 |
| Heat-Resistant Resin | Type | — | PP | PBT | — |
| | Mw$^{(1)}$/% by mass | —/— | 5.3 × 10$^5$/5 | 3.8 × 10$^4$/5 | —/— |
| PE composition | | | | | |
| Mw$^{(1)}$ | | 4.3 × 10$^5$ | 4.4 × 10$^5$ | 4.4 × 10$^5$ | 6.4 × 10$^5$ |
| Mw/Mn$^{(2)}$ | | 16.0 | 16.0 | 16.0 | 21.0 |
| Melting Point (° C.) | | 135 | 135 | 135 | 135 |
| Crystal Dispersion Temp. (° C.) | | 100 | 100 | 100 | 100 |
| Production Conditions | | | | | |
| Conc. (% by mass) of A and B$^{(3)}$ Extrudate | | 40/20 | 40/20 | 40/20 | 40/15 |
| Layer Structure$^{(5)}$ | | A/B/A | A/B/A | A/B/A | A/B/A |
| Layer Thickness Ratio | | 1/1/1 | 1/1/1 | 1/1/1 | 1/1/1 |
| Stretching Multi-Layer, Gel-Like Sheet | | | | | |
| Temp. (° C.)/(MD × TD)$^{(6)}$ Gel-Like Sheet A | | 117.5/5 × 5 | 117.5/5 × 5 | 117.5/5 × 5 | 115/5 × 5 |
| Temp. (° C.)/(MD × TD)$^{(6)}$ Gel-Like Sheet B | | —/— | —/— | —/— | —/— |
| Temp. (° C.)/(MD × TD)$^{(6)}$ Heat-Setting of Gel-Like Sheet | | —/— | —/— | —/— | —/— |
| Temp. (° C.)/Time (minute) Hot Solvent Treatment$^{(7)}$ | | —/— | —/— | —/— | 122/10 |
| Solvent | | — | — | — | — |
| Temp. (° C.)/Time (sec.) Lamination | | —/— | —/— | —/— | —/— |
| Temp. (° C.)/Pressure (MPa) | | —/— | —/— | —/— | —/— |
| Layer Structure$^{(8)}$ | | — | — | — | — |
| Layer Thickness Ratio | | — | — | — | — |
| Re-Stretching | | | | | |
| Temp. (° C.)/Direction/Magnification Heat-Setting | | 129/TD/1.4 | 129/TD/1.4 | 129/TD/1.4 | 129.5/TD/1.4 |
| Temp. (° C.)/Time (minute) | | 129/10 | 129/10 | 129/10 | 129.5/10 |

| | | Example 9 | Example 10 | Example 11 | Example 12 |
|---|---|---|---|---|---|
| Composition of Resin | | | | | |
| Resin Composition A | | | | | |
| UHMWPE | Mw$^{(1)}$/% by mass | 2.0 × 10$^6$/35 | 2.0 × 10$^6$/5 | 2.0 × 10$^6$/30 | 2.0 × 10$^6$/30 |
| HDPE | Mw$^{(1)}$/% by mass | 3.5 × 10$^5$/65 | 3.5 × 10$^5$/95 | 3.5 × 10$^5$/70 | 3.5 × 10$^5$/70 |
| Heat-Resistant Resin | Type | — | — | — | — |
| | Mw$^{(1)}$/% by mass | —/— | —/— | —/— | —/— |
| PE composition | | | | | |
| Mw$^{(1)}$ | | 9.3 × 10$^5$ | 4.3 × 10$^5$ | 8.2 × 10$^5$ | 8.2 × 10$^5$ |
| Mw/Mn$^{(2)}$ | | 24.5 | 16.0 | 23.5 | 23.5 |
| Melting Point (° C.) | | 135 | 135 | 135 | 135 |
| Crystal Dispersion Temp. (° C.) | | 100 | 100 | 100 | 100 |
| Resin Composition B | | | | | |
| UHMWPE | Mw$^{(1)}$/% by mass | 2.0 × 10$^6$/18 | 2.0 × 10$^6$/18 | 2.0 × 10$^6$/18 | 2.0 × 10$^6$/18 |
| HDPE | Mw$^{(1)}$/% by mass | 3.5 × 10$^5$/82 | 3.5 × 10$^5$/82 | 3.5 × 10$^5$/82 | 3.5 × 10$^5$/82 |
| Heat-Resistant Resin | Type | — | — | — | — |
| | Mw$^{(1)}$/% by mass | —/— | —/— | —/— | —/— |
| PE composition | | | | | |
| Mw$^{(1)}$ | | 6.4 × 10$^5$ | 6.4 × 10$^5$ | 6.4 × 10$^5$ | 6.4 × 10$^5$ |
| Mw/Mn$^{(2)}$ | | 21.0 | 21.0 | 21.0 | 21.0 |
| Melting Point (° C.) | | 135 | 135 | 135 | 135 |
| Crystal Dispersion Temp. (° C.) | | 100 | 100 | 100 | 100 |
| Production Conditions | | | | | |
| Conc. (% by mass) of A and B$^{(3)}$ | | 40/15 | 40/20 | 30/15 | 30/15 |

TABLE 1-continued

| Extrudate | | | | |
|---|---|---|---|---|
| Layer Structure[5] | A/B/A | — | A/B | — |
| Layer Thickness Ratio | 1/1/1 | — | 1/1 | — |
| Stretching Multi-Layer, Gel-Like Sheet | | | | |
| Temp. (° C.)/(MD × TD)[6] Gel-Like Sheet A | 115/5 × 5 | —/— | 119.2/5 × 5 | —/— |
| Temp. (° C.)/(MD × TD)[6] Gel-Like Sheet B | —/— | 116/5 × 5 | —/— | 119.2/5 × 5 |
| Temp. (° C.)/(MD × TD)[6] Heat-Setting of Gel-Like Sheet | —/— | 116/5 × 5 | —/— | 119.2/5 × 5 |
| Temp. (° C.)/Time (minute) Hot Solvent Treatment[7] | —/— | —/— | —/— | —/— |
| Solvent | LP[9] | — | — | — |
| Temp. (° C.)/Time (sec.) | 120/3 | —/— | —/— | —/— |
| Lamination | | | | |
| Temp. (° C.)/Pressure (MPa) | —/— | 110/0.05 | —/— | 110/0.05 |
| Layer Structure[8] | — | A/B | — | A/B |
| Layer Thickness Ratio | — | 1/1 | — | 1/1 |
| Re-Stretching | | | | |
| Temp. (° C.)/Direction/Magnification | 130/TD/1.4 | —/—/— | 110/TD/1.4 | 110/TD/1.4 |
| Heat-Setting | | | | |
| Temp. (° C.)/Time (minute) | 130/10 | 126/10 | 110/10 | 120/10 |

| No. | Example 13 | Example 14 | Comp. Ex. 1 | Comp. Ex. 2 |
|---|---|---|---|---|
| Composition of Resin | | | | |
| Resin Composition A | | | | |
| UHMWPE  Mw[1]/% by mass | $2.0 \times 10^6$/5 | $2.0 \times 10^6$/5 | $2.0 \times 10^6$/20 | $2.0 \times 10^6$/18 |
| HDPE  Mw[1]/% by mass | $3.5 \times 10^5$/95 | $3.5 \times 10^5$/95 | $3.5 \times 10^5$/80 | $3.5 \times 10^5$/82 |
| Heat-Resistant Resin  Type | — | — | — | — |
|   Mw[1]/% by mass | —/— | —/— | —/— | —/— |
| PE composition | | | | |
| Mw[1] | $4.3 \times 10^5$ | $4.3 \times 10^5$ | $6.8 \times 10^5$ | $6.4 \times 10^5$ |
| Mw/Mn[2] | 16.0 | 16.0 | 20.0 | 21.0 |
| Melting Point (° C.) | 135 | 135 | 135 | 135 |
| Crystal Dispersion Temp. (° C.) | 100 | 100 | 100 | 100 |
| Resin Composition B | | | | |
| UHMWPE  Mw[1]/% by mass | $2.0 \times 10^6$/18 | $2.0 \times 10^6$/18 | —/— | $2.0 \times 10^6$/18 |
| HDPE  Mw[1]/% by mass | $3.5 \times 10^5$/82 | $3.5 \times 10^5$/82 | —/— | $3.5 \times 10^5$/82 |
| Heat-Resistant Resin  Type | — | — | — | — |
|   Mw[1]/% by mass | —/— | —/— | —/— | —/— |
| PE composition | | | | |
| Mw[1] | $6.4 \times 10^5$ | $6.4 \times 10^5$ | — | $6.4 \times 10^5$ |
| Mw/Mn[2] | 21.0 | 21.0 | — | 21.0 |
| Melting Point (° C.) | 135 | 135 | — | 135 |
| Crystal Dispersion Temp. (° C.) | 100 | 100 | — | 100 |
| Production Conditions | | | | |
| Conc. (% by mass) of A and B[3] | 30/20 | 30/20 | 30/— | 30/28 |
| Extrudate | | | | |
| Layer Structure[5] | A/B | — | — | A/B/A |
| Layer Thickness Ratio | 1/1 | — | — | 1/1/1 |
| Stretching Multi-Layer, Gel-Like Sheet | | | | |
| Temp. (° C.)/(MD × TD)[6] Gel-Like Sheet A | —/— | —/— | — | 115/5 × 5 |
| Temp. (° C.)/(MD × TD)[6] Gel-Like Sheet B | —/— | —/— | 115/5 × 5 | —/— |
| Temp. (° C.)/(MD × TD)[6] | —/— | —/— | —/— | |

TABLE 1-continued

| Heat-Setting of Gel-Like Sheet | | | | |
|---|---|---|---|---|
| Temp. (° C.)/Time (minute) | — | — | — | — |
| Hot Solvent Treatment[7] | | | | |
| Solvent | — | — | — | — |
| Temp. (° C.)/Time (sec.) | —/— | —/— | —/— | —/— |
| Lamination | | | | |
| Temp. (° C.)/Pressure (MPa) | —/— | 110/0.05 | —/— | —/— |
| Layer Structure[8] | — | A/B | — | — |
| Layer Thickness Ratio | — | 1/1 | — | — |
| Re-Stretching | | | | |
| Temp. (° C.)/Direction/Magnification | —/—/— | —/—/— | —/—/— | 124/TD/1.4 |
| Heat-Setting | | | | |
| Temp. (° C.)/Time (minute) | 125/10 | 128/10 | 125/10 | 124/10 |

Note:
[1] Mw represents a mass-average molecular weight.
[2] Mw/Mn represents a molecular weight distribution.
[3] The concentrations of the resin compositions in the resin solutions A and B, respectively.
[4] The resin concentration in the resin solution A/the resin concentration in the resin solution B.
[5] A represents a resin solution A, and B represents a resin solution B.
[6] Temperature (° C.)/stretching magnification (fold) in MD and TD, wherein MD represents a longitudinal direction, and TD represents a transverse direction.
[7] The heat-setting of a gel-like sheet.
[8] A represents a microporous membrane A, and B represents a microporous membrane B.
[9] LP represents liquid paraffin.

The properties of the microporous polyethylene membranes obtained in Examples 1 to 14 and Comparative Examples 1 and 2 were measured by the following methods. The results are shown in Table 2.

(1) Average Thickness (μm)

The thickness of the microporous polyethylene membrane was measured at a 5-mm interval over a width of 30 cm by a contact thickness meter, and the measured thickness was averaged.

(2) Air Permeability (sec/100 cm³/20 μm)

The air permeability $P_1$ of the microporous polyethylene membrane having a thickness $T_1$ was measured according to JIS P8117, and converted to air permeability $P_2$ at a thickness of 20 μm by the formula of $P_2=(P_1 \times 20)/T_1$.

(3) Porosity (%)

It was measured by a mass method.

(4) Pin Puncture Strength (mN/20 μm)

The maximum load was measured when a microporous polyethylene membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1 \times 20)/T_1$, which was regarded as pin puncture strength.

(5) Tensile Rupture Strength and Tensile Rupture Elongation

They were measured using a 10-mm-wide rectangular test piece according to ASTM D882.

(6) Heat Shrinkage Ratio (%)

The shrinkage ratio of the microporous polyethylene membrane after exposed to 105° C. for 8 hours was measured three times in both longitudinal direction (MD) and transverse direction (TD) and averaged.

(7) Shutdown Temperature

Using a thermomechanical analyzer (TMA/SS6000 available from Seiko Instruments, Inc.), a test piece of 10 mm (TD)×3 mm (MD) was heated at a speed of 5° C./minute from room temperature while being longitudinally drawn under a load of 2 g. A temperature at an inflection point observed near the melting point was regarded as a shutdown temperature.

(8) Meltdown Temperature (° C.)

Using the above thermomechanical analyzer, a test piece of 10 mm (TD)×3 mm (MD) was heated from room temperature at a speed of 5° C./minute while longitudinally drawing by a load of 2 g, to measure a temperature at which the membrane was broken by melting.

(9) Ratio of Thickness Change by Heat Compression

A microporous membrane sample was sandwiched by a pair of press plates each having a highly smooth surface, and heat-compressed by a press machine at a pressure of 2.2 MPa (22 kgf/cm²) and 90° C. for 5 minutes to measure the average thickness by the above method. A thickness change ratio was calculated, assuming that the pre-compression thickness was 100%.

(10) Post-Compression Air Permeability (sec/100 cm³)

The air permeability of the microporous polyethylene membrane heat-compressed under the above conditions was measured according to JIS P8117, and regarded as "post-compression air permeability."

(11) Average Pore Diameter 50 pores were arbitrarily selected in each microporous layer A, B in a transmission electron photmicrograph (TEM photograph) of a cross section of the microporous membrane, and their sizes were measured and averaged to determine an average pore diameter in each layer.

TABLE 2

| | No. | | | |
|---|---|---|---|---|
| | Example 1 | Example 2 | Example 3 | Example 4 |
| Properties of Microporous Membrane | | | | |
| Average Thickness (μm) | 28.2 | 21.5 | 20.8 | 22.4 |
| Air Permeability (sec/100 cm³/20 μm) | 315 | 210 | 275 | 347 |

TABLE 2-continued

| | | | | | |
|---|---|---|---|---|---|
| Porosity (%) | | 43.6 | 47.8 | 48.1 | 48.1 |
| Pin Puncture Strength | (g/20 μm) | 480 | 520 | 612 | 668 |
| | (mN/20 μm) | 4,704 | 5,096 | 5,998 | 6,546 |
| Tensile Rupture Strength | | | | | |
| (kg/cm², kPa) | MD | 1,350/132,300 | 1,480/145,040 | 1,670/163,660 | 1,750/171,500 |
| | TD | 1,150/112,700 | 1,470/144,060 | 1,560/152,880 | 1,790/175,420 |
| Tensile Rupture Elongation (%) | | | | | |
| MD/TD | | 150/280 | 170/180 | 140/120 | 135/130 |
| Heat Shrinkage Ratio (%) | | | | | |
| MD/TD | | 5/4 | 4/6 | 6/8 | 6.5/8 |
| Thermal Properties | | | | | |
| Shutdown Temperature (° C.) | | 135 | 140 | 140 | 140 |
| Meltdown Temperature (° C.) | | 165 | 165 | 165 | 165 |
| Compression Resistance | | | | | |
| Thickness Change (%) | | 22 | 24 | 16 | 14 |
| Post-Compression Air Permeability (sec/100 cm³/20 μm) | | 620 | 510 | 630 | 760 |
| Average Pore Diameter (μm)[1] | | | | | |
| Microporous Layer A | | 0.03 (Inner) | 0.04 (Inner) | 0.04 (Surface) | 0.04 (Surface) |
| Microporous Layer B | | 0.06 (Surface) | 0.09 (Surface) | 0.08 (Inner) | 0.08 (Inner) |

| | | No. | | | |
|---|---|---|---|---|---|
| | | Example 5 | Example 6 | Example 7 | Example 8 |
| Properties of Microporous Membrane | | | | | |
| Average Thickness (μm) | | 21 | 21 | 21 | 20.5 |
| Air Permeability (sec/100 cm³/20 μm) | | 210 | 190 | 180 | 212 |
| Porosity (%) | | 40 | 38 | 37 | 43 |
| Pin Puncture Strength | (g/20 μm) | 550 | 490 | 460 | 590 |
| | (mN/20 μm) | 5,390 | 4,802 | 4,508 | 5,782 |
| Tensile Rupture Strength | | | | | |
| (kg/cm², kPa) | MD | 1,340/131,320 | 1,180/115,640 | 1,020/99,960 | 1,505/147,490 |
| | TD | 1,330/130,340 | 1,200/117,600 | 1,090/106,820 | 1,510/147,980 |
| Tensile Rupture Elongation (%) | | | | | |
| MD/TD | | 170/160 | 160/140 | 140/130 | 160/145 |
| Heat Shrinkage Ratio (%) | | | | | |
| MD/TD | | 4/6 | 3/4 | 3/4 | 5/5 |
| Thermal Properties | | | | | |
| Shutdown Temperature (° C.) | | 140 | 140 | 140 | 140 |
| Meltdown Temperature (° C.) | | 160 | 175 | 175 | 165 |
| Compression Resistance | | | | | |
| Thickness Change (%) | | 18 | 24 | 28 | 19 |
| Post-Compression Air Permeability (sec/100 cm³/20 μm) | | 480 | 450 | 410 | 510 |
| Average Pore Diameter (μm)[1] | | | | | |
| Microporous Layer A | | 0.07 (Surface) | 0.09 (Surface) | 0.09 (Surface) | 0.05 (Surface) |
| Microporous Layer B | | 0.1 (Inner) | 0.1 (Inner) | 0.1 (Inner) | 0.09 (Inner) |

| | | No. | | | |
|---|---|---|---|---|---|
| | | Example 9 | Example 10 | Example 11 | Example 12 |
| Properties of Microporous Membrane | | | | | |
| Average Thickness (μm) | | 22 | 24.3 | 16 | 30.5 |
| Air Permeability (sec/100 cm³/20 μm) | | 196 | 470 | 50 | 110 |
| Porosity (%) | | 48.1 | 42.1 | 63 | 60.5 |
| Pin Puncture Strength | (g/20 μm) | 560 | 580 | 220 | 410 |
| | (mN/20 μm) | 5,488 | 5,684 | 2,156 | 4,018 |
| Tensile Rupture Strength | | | | | |
| (kg/cm², kPa) | MD | 1,450/142,100 | 1,450/142,100 | 950/93,100 | 850/83,300 |
| | TD | 1,490/146,020 | 1,200/117,600 | 780/76,440 | 940/92,120 |
| Tensile Rupture Elongation (%) | | | | | |
| MD/TD | | 160/150 | 170/180 | 170/140 | 160/140 |

TABLE 2-continued

| | | | | |
|---|---|---|---|---|
| Heat Shrinkage Ratio (%) | | | | |
| MD/TD | 5/4 | 2/0 | 13/15 | 12/16 |
| Thermal Properties | | | | |
| Shutdown Temperature (° C.) | 140 | 135 | 135 | 135 |
| Meltdown Temperature (° C.) | 165 | 165 | 165 | 165 |
| Compression Resistance | | | | |
| Thickness Change (%) | 22 | 19 | 27 | 25 |
| Post-Compression Air Permeability (sec/100 cm$^3$/20 μm) | 490 | 890 | 213 | 250 |
| Average Pore Diameter (μm)[1] | | | | |
| Microporous Layer A | 0.06 (Surface) | 0.03 | 0.05 | 0.05 |
| Microporous Layer B | 0.1 (Inner) | 0.05 | 0.07 | 0.07 |

| | No. | | | |
|---|---|---|---|---|
| | Example 13 | Example 14 | Comp. Ex. 1 | Comp. Ex. 2 |
| Properties of Microporous Membrane | | | | |
| Average Thickness (μm) | 60 | 60 | 16 | 22 |
| Air Permeability (sec/100 cm$^3$/20 μm) | 35 | 40 | 400 | 445 |
| Porosity (%) | 64.8 | 65.2 | 38 | 40 |
| Pin Puncture Strength (g/20 μm) | 120 | 110 | 400 | 520 |
| (mN/20 μm) | 1,176 | 1,078 | 3,920 | 5,096 |
| Tensile Rupture Strength | | | | |
| (kg/cm$^2$, kPa) MD | 180/17,640 | 200/19,600 | 1,400/137,200 | 1,240/121,520 |
| TD | 140/13,720 | 150/14,700 | 1,200/117,600 | 1,200/117,600 |
| Tensile Rupture Elongation (%) | | | | |
| MD/TD | 190/180 | 200/180 | 145/230 | 170/160 |
| Heat Shrinkage Ratio (%) | | | | |
| MD/TD | 27/18 | 25/20 | 6/4 | 5/6 |
| Thermal Properties | | | | |
| Shutdown Temperature (° C.) | 130 | 130 | 135 | 135 |
| Meltdown Temperature (° C.) | 160 | 160 | 160 | 165 |
| Compression Resistance | | | | |
| Thickness Change (%) | 30 | 30 | 18 | 16 |
| Post-Compression Air Permeability (sec/100 cm$^3$/20 μm) | 120 | 150 | 1,060 | 1,070 |
| Average Pore Diameter (μm)[1] | | | | |
| Microporous Layer A | 0.1 | 0.05 | 0.03 | 0.03 (Surface) |
| Microporous Layer B | 0.2 | 0.2 | 0.03 | 0.03 (Inner) |

Note:
[1] Surface represents a surface layer, and Inner represents an inner layer.

It is clear from Table 2 that because each microporous polyethylene membrane of Examples 1 to 14 produced by the method of this invention had a gradient structure in which an average pore diameter changed in a thickness direction, it had excellent compression resistance (deformability when compressed and permeability after compression), permeability, mechanical properties, heat shrinkage resistance and thermal properties.

On the other hand, one resin solution was used to form the gel-like sheet in Comparative Example 1, and two resin solutions used to form the three-layer, gel-like sheet in Comparative Example 2 had a resin concentration difference of less than 5% by mass. Accordingly, any membranes of Comparative Examples 1 and 2 had larger post-compression air permeability and poorer compression resistance than those in Examples 1 to 14.

Effect of the Invention

According to this invention, a microporous polyethylene membrane with an average pore diameter changing in a thickness direction, which has well-balanced permeability, mechanical properties, heat shrinkage resistance, compression resistance, electrolytic solution absorbability, shutdown properties and meltdown properties, can be produced while easily controlling an average pore diameter distribution in a thickness direction. It is easy to control the ratio of the coarse-structure layer having a larger average pore diameter to the dense-structure layer having a smaller average pore diameter, and the pore size in each layer. The use of the microporous polyethylene membrane produced by the method of this invention as a battery separator provides batteries with excellent capacity, cycle properties, discharge properties, heat resistance, compression resistance and productivity.

What is claimed is:

1. A method for producing a microporous polyethylene membrane having an average pore diameter changing in a thickness direction, comprising the steps of melt-blending at least a polyethylene resin comprising ultra-high-molecular-weight polyethylene and high-density polyethylene, and a membrane-forming solvent to prepare a polyethylene resin solution A having a resin concentration of 25 to 50% by mass, melt-blending at least a polyethylene resin comprising the same ultra-high-molecular-weight polyethylene and high-density polyethylene as those in said polyethylene resin solution A, and a membrane-forming solvent to prepare a polyethylene resin solution B having a resin concentration of 10 to 30% by mass, the resin concentration in said polyethylene resin solution A being higher than that in said polyethylene resin solution B; simultaneously extruding said polyethylene resin solutions A and B through a die; cooling the resultant laminate extrudate to provide a gel-like sheet; and removing said membrane-forming solvent from said gel-like sheet.

2. A method for producing a microporous polyethylene membrane having an average pore diameter changing in a thickness direction, comprising the steps of melt-blending at least a polyethylene resin comprising ultra-high-molecular-weight polyethylene and high-density polyethylene, and a membrane-forming solvent to prepare a polyethylene resin solution A having a resin concentration of 25 to 50% by mass, melt-blending at least a polyethylene resin comprising the same ultra-high-molecular-weight polyethylene and high-density polyethylene as those in said polyethylene resin solution A, and a membrane-forming solvent to prepare a polyethylene resin solution B having a resin concentration of 10 to 30% by mass, the resin concentration in said polyethylene resin solution A being higher than that in said polyethylene resin solution B; extruding said polyethylene resin solutions A and B through separate dies; cooling the resultant extrudates to provide gel-like sheets A and B; removing said membrane-forming solvent from said gel-like sheets A and B to form microporous polyethylene membranes A and B; and alternately laminating said microporous polyethylene membranes A and B.

3. The method for producing a microporous polyethylene membrane according to claim 1, wherein the resin concentration difference between said polyethylene resin solutions A and B is 5% or more by mass.

4. The method for producing a microporous polyethylene membrane according to claim 1, wherein said ultra-high-molecular-weight polyethylene has a mass-average molecular weight of $7 \times 10^5$ or more, and said high-density polyethylene has a mass-average molecular weight of $1 \times 10^4$ or more and less than $5 \times 10^5$.

5. The method for producing a microporous polyethylene membrane according to claim 1, wherein each of the polyethylene resins for said polyethylene resin solution A and B is a composition comprising said ultra-high-molecular-weight polyethylene, said high-density polyethylene, and a heat-resistant resin having a melting point or glass transition temperature of 150° C. or higher.

6. The method for producing a microporous polyethylene membrane according to claim 5, wherein said heat-resistant resin is polypropylene or polybutylene terephthalate.

7. The method for producing a microporous polyethylene membrane according to claim 2, wherein the resin concentration difference between said polyethylene resin solutions A and B is 5% or more by mass.

8. The method for producing a microporous polyethylene membrane according to claim 2, wherein said ultra-high-molecular-weight polyethylene has a mass-average molecular weight of $7 \times 10^5$ or more, and said high-density polyethylene has a mass-average molecular weight of $1 \times 10^4$ or more and less than $5 \times 10^5$.

* * * * *